United States Patent [19]
Yamada et al.

[11] Patent Number: 5,600,399
[45] Date of Patent: Feb. 4, 1997

[54] OPTICAL APPARATUS AND CAMERA FOR CONTROLLING A PLURALITY OF FUNCTIONS BY USING A VISUAL AXIS

[75] Inventors: Akira Yamada; Yoshiaki Irie, both of Yokohama; Akihiko Nagano, Ichihara, all of Japan

[73] Assignee: Canon Kabushiki Kaisha, Tokyo, Japan

[21] Appl. No.: 602,597

[22] Filed: Feb. 16, 1996

Related U.S. Application Data

[63] Continuation of Ser. No. 348,134, Nov. 23, 1994, abandoned.

[30]      Foreign Application Priority Data

Nov. 25, 1993  [JP]  Japan ..................... 5-317537

[51] Int. Cl.⁶ .......................... G03B 13/16; G03B 17/20
[52] U.S. Cl. ............................ 396/51; 396/292; 396/296
[58] Field of Search ...................... 354/409, 402, 354/410, 465, 471, 474, 62, 219, 432

[56]      References Cited

U.S. PATENT DOCUMENTS

| | | | |
|---|---|---|---|
| 4,946,271 | 8/1990 | Palsgard et al. | 351/210 |
| 5,036,347 | 7/1991 | Tsunekawa et al. | 354/400 |
| 5,182,443 | 1/1993 | Suda et al. | 250/201.2 |
| 5,214,466 | 5/1993 | Nagano et al. | 354/402 |
| 5,225,862 | 7/1993 | Nagano et al. | 354/62 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,298,927 | 3/1994 | Konishi et al. | 351/211 |
| 5,386,258 | 1/1995 | Nagano | 354/400 |

FOREIGN PATENT DOCUMENTS

| | | |
|---|---|---|
| 1-274736 | 11/1989 | Japan . |
| 3-87818 | 4/1991 | Japan . |
| 3-109029 | 5/1991 | Japan . |

*Primary Examiner*—W. B. Perkey
*Attorney, Agent, or Firm*—Fitzpatrick, Cella, Harper & Scinto

[57]      ABSTRACT

This invention relates to an optical apparatus with a visual axis detection function. The apparatus having finder means for observing an object, and visual axis detection means for detecting a visual axis position of an observer who looks into a field of view of a finder comprises a visual axis input index which is arranged in the field of view of the finder means, visual axis input means for executing a predetermined function selected when the visual axis detection means detects that the visual axis of the observer is located on or near the visual axis input index and selection means for causing the observer to select the predetermined function to be executed by said visual axis input means from a plurality of functions.

20 Claims, 21 Drawing Sheets

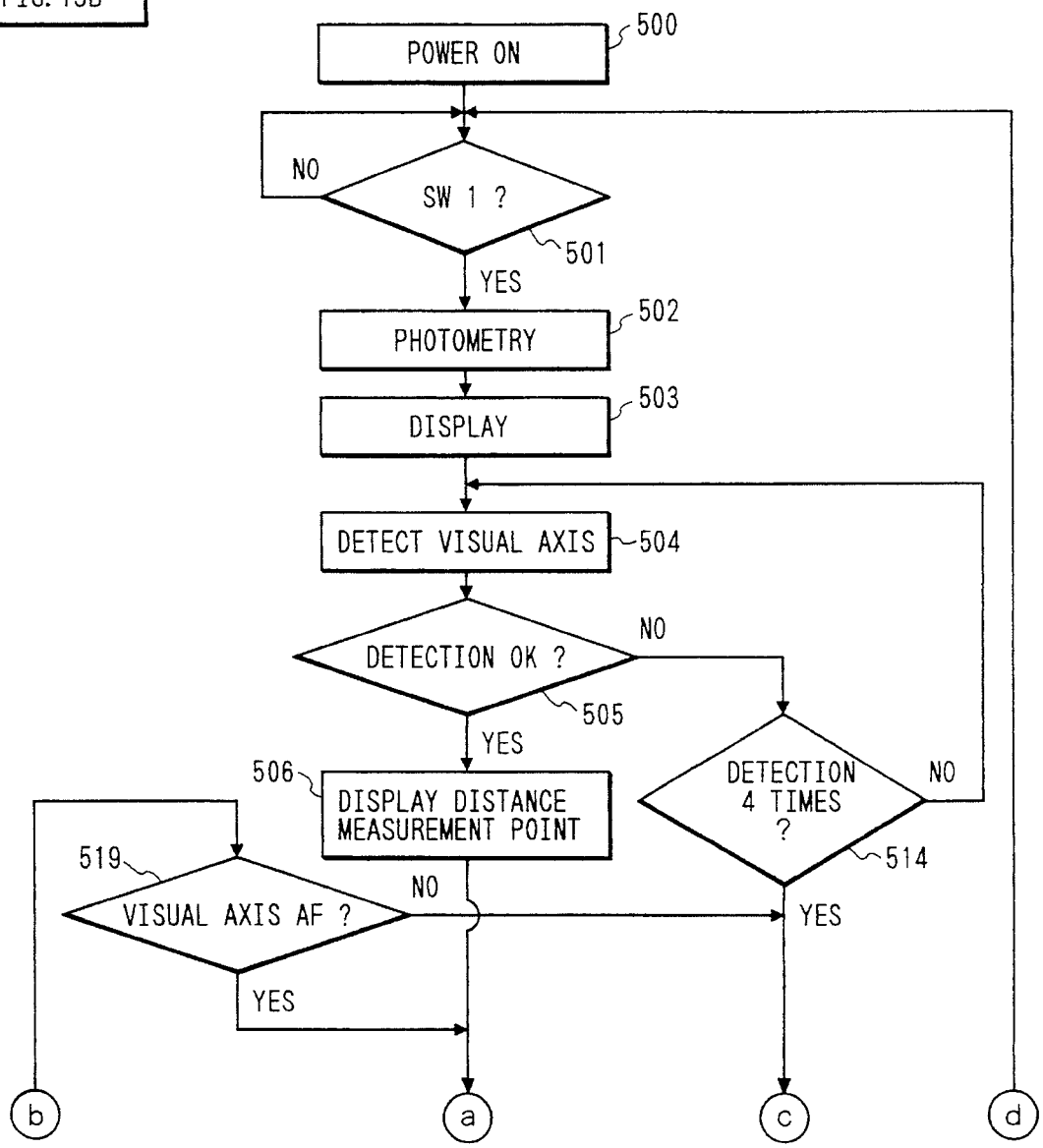

OPTICAL APPARATUS AND CAMERA FOR CONTROLLING A PLURALITY OF FUNCTIONS BY USING A VISUAL AXIS

This application is a continuation of application Ser. No. 08/348,134 filed Nov. 23, 1994, now abandoned.

BACKGROUND OF THE INVENTION

1. Filed of the Invention

The present invention relates to an optical apparatus such as a camera, which comprises a finder for observing an object, and a visual axis detector for detecting the position of the visual axis of an observer who looks into the field of view of the finder.

2. Related Background Art

Conventionally, various visual axis detection devices for detecting an observation position by an observer, in the field of view, have been proposed.

For example, Japanese Laid-Open Patent Application No. 1-274736 proposes a device, which detects a rotational angle of an eyeball of a photographer by illuminating the eyeball with light emitted from, e.g., an infrared light-emitting diode, guiding the light reflected by an eyeball to an image sensor such as a CCD to form an eyeball image on the sensor, and detecting the shift amount of a cornea reflected image obtained upon reflection on the surface of the cornea relative to the center of the image of the pupil on the basis of the eyeball image.

Also, Japanese Laid-Open Patent Application No. 3-87818 proposes a device for allowing selection of a control function of a camera on the basis of the visual axis position of an observer.

SUMMARY OF THE INVENTION

It is the first object of the present invention to provide an optical apparatus with a visual axis detection function, which can arbitrarily select and execute various functions by a visual axis input with a simple display on the field of view of the finder.

It is the second object of the present invention to provide an optical apparatus with a visual axis detection function, which can improve operability upon setting of functions based on the visual axis input.

It is the third object of the present invention to provide a camera, which can inform, to a user, that a photographing mode upon setting of functions based on a visual axis input is a panorama photographing mode, without disturbing framing.

It is the fourth object of the present invention to provide an optical apparatus with a visual axis detection function, which can select whether or not a function setting mode based on a visual axis input is necessary, and can prevent an input error when it is unnecessary.

According to the first aspect of the present invention, an apparatus comprises a visual axis input index (pattern) arranged in a field of view of a finder, visual axis input means for detecting that the visual axis of an observer is present at or near the visual axis input index and operating a given function, and selection means for causing the observer to arbitrarily select the given function operated by the visual axis input means from a plurality of functions.

According to the second aspect of the present invention, an apparatus comprises a visual axis input index arranged in a field of view of a finder, visual axis input means for detecting that the visual axis of an observer is present at or near the visual axis input index, and executing a designated function, and changing means for changing the function executed by the visual axis input means in correspondence with an operation mode set by mode setting means.

According to the third aspect of the present invention, an apparatus comprises a panorama index which is arranged in a field of view of a finder and indicates a panorama photographing range, a visual axis input index which is arranged outside the panorama index in the field of view of the finder, and index display control means, when a panorama mode is set by panorama mode setting means for displaying the visual axis input index in a display pattern different from that in a normal photographing mode.

According to the fourth aspect of the present invention, an apparatus comprises visual axis selection means for selecting one of a plurality of areas as a focusing point detection area on the basis of the visual axis position of an observer, and visual axis input means for executing a predetermined function when it is detected that the visual axis of the observer is present at or near a visual axis input index arranged in the field of view of a finder, wherein the visual axis selection means and the visual axis input means are independently operated so that it can be arbitrarily and respectively selected whether or not the visual axis selection means and the visual axis input means are operated.

According to the fifth aspect of the present invention, an optical apparatus having a plurality of functions comprises an index provided in the field of view, input means for detecting that the visual axis is directed to a position near the index, and controlling the optical apparatus to execute at least one function, and selection means for selecting the function which is executed by the optical apparatus under the control of the input means from the plurality of functions.

BRIEF DESCRIPTION OF THE DRAWINGS

FIGS. 20A to 20F are views showing the display state on an LCD for monitor upon selection of a custom function mode by the mode dial shown in FIG. 19; and FIGS. 21A to 21F are views showing the display state on the LCD for monitor upon selection of a visual axis input function from the state shown in FIGS. 20A to 20F using an electronic dial.

DETAILED DESCRIPTION OF THE PREFERRED EMBODIMENTS

The present invention will be described in detail hereinafter with reference to the illustrated embodiments.

Figure 1:
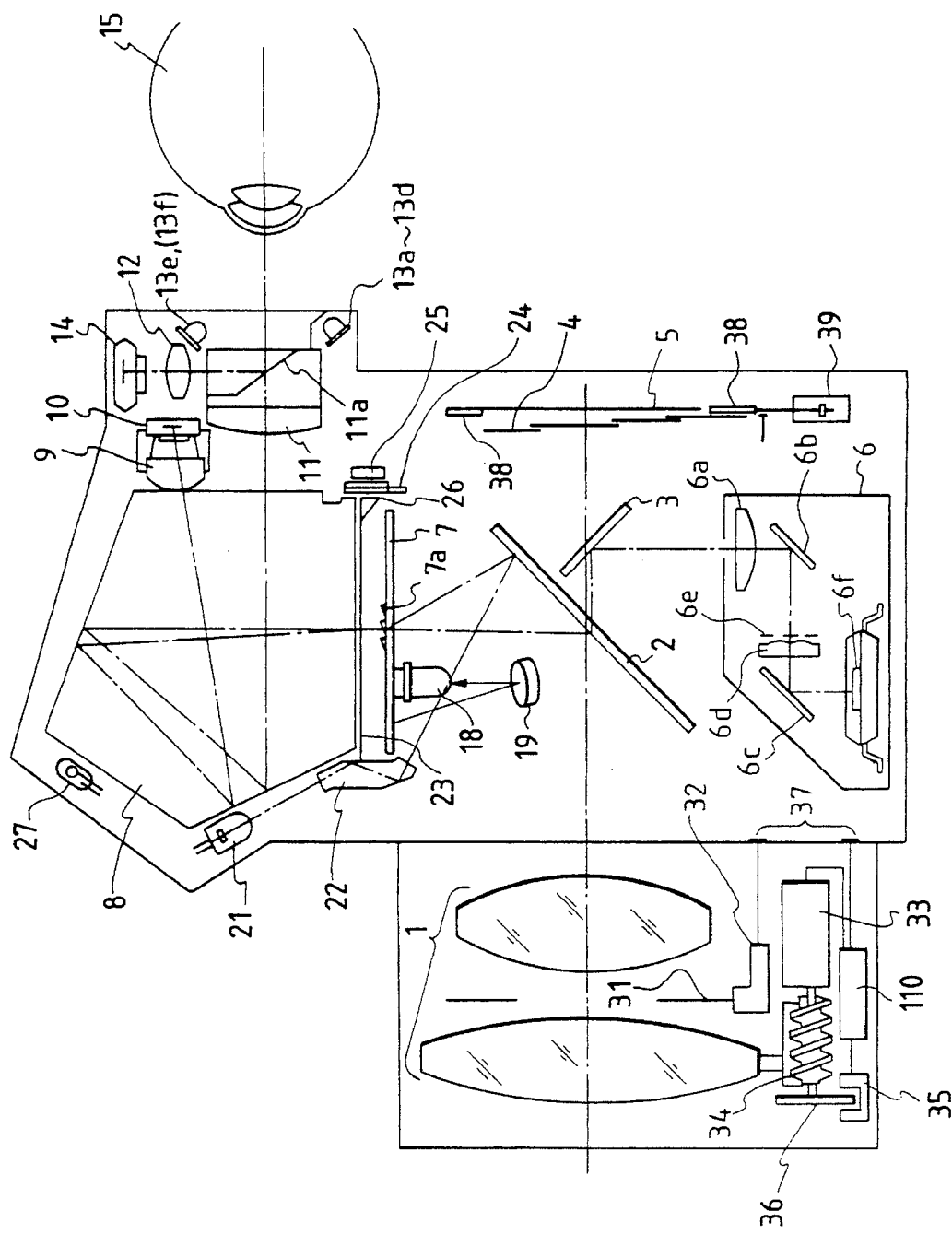
FIG. 1 is a sectional view showing the arrangement of an optical system according to the first embodiment in which the present invention is applied to a single-lens reflex camera.
Figure 2:
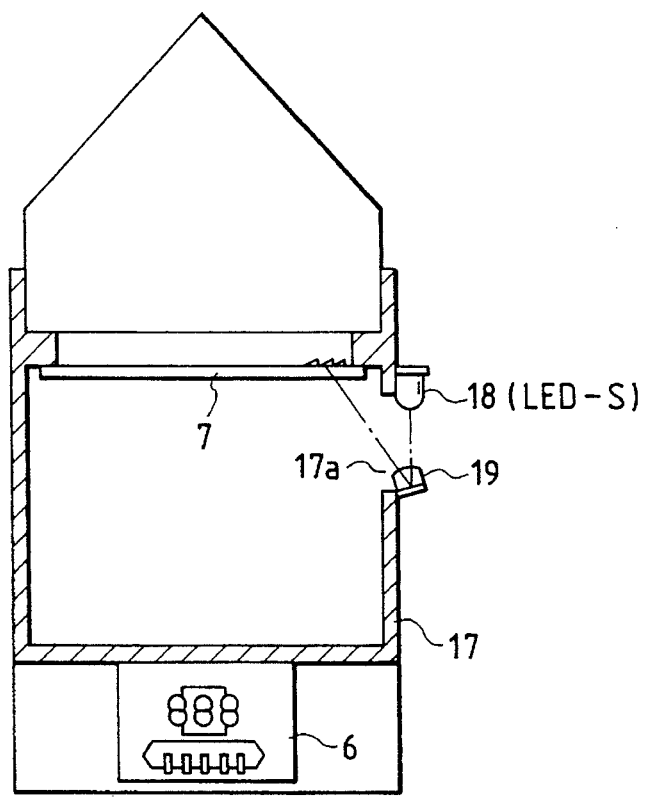
FIG. 2 is a rear sectional view of the camera shown in FIG. 1.
Figure 3:
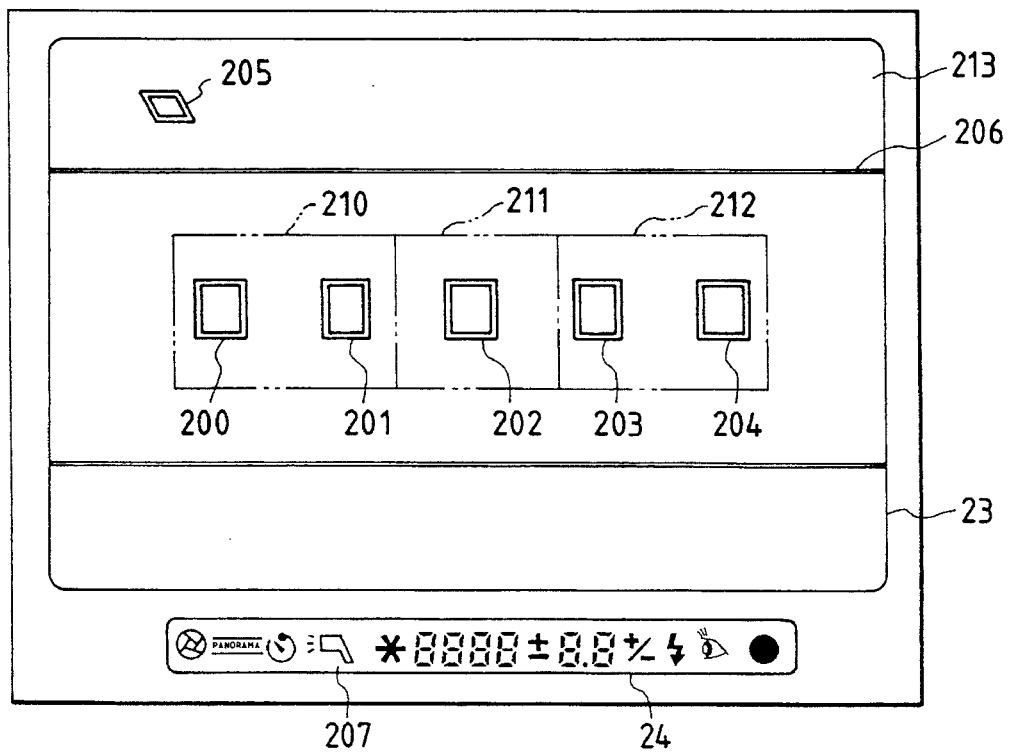
FIG. 3 is a plan view showing the field of view of a finder of the camera shown in FIG. 1.

FIG. 1 is a sectional view showing the arrangement of a main part of the first embodiment in which the present invention is applied to a single-lens reflex camera, FIG. 2 is a rear sectional view of FIG. 1, and FIG. 3 is an explanatory view in a finder of the single-lens reflex camera shown in FIG. 1.

Referring to FIGS. 1 to 3, a photographing lens 1 is normally constituted by a large number of lenses although it is illustrated as two lenses for the sake of simplicity. A main mirror 2 is obliquely inserted in or retracted from a photographing optical path depending on an observation/photographing operation of an object image, which is being performed by a finder system. A sub mirror 3 reflects a light beam transmitted through the main mirror 2 toward a focusing point detection device 6 (to be described later) in a lower portion of a camera body.

The camera also includes a shutter 4 and a photosensitive member 5. The photosensitive member 5 comprises a silver salt film, a solid-state image pickup element such as a CCD or a MOS type device, or an image pickup tube such as a VIDICON.

The focusing point detection device 6 is constituted by a field lens 6a arranged near the imaging plane, reflection mirrors 6b and 6c, a secondary imaging lens 6d, a stop 6e, a line sensor 6f consisting of a plurality of CCDs, and the like.

The focusing point detection device 6 of this embodiment performs focusing point detection on the basis of a known phase difference method. As shown in FIG. 3, the device 6 is designed to allow focusing point detection at a plurality of areas (five areas 200 to 204) as distance measurement points in an observation frame (in the field of view of a finder).

A focusing screen 7 is arranged at a prospective imaging plane of the photographing lens 1, and a pentagonal prism 8 is used for changing the finder optical path. An imaging lens 9 and a photometry sensor 10 are used for measuring the object luminance in the observation frame. The imaging lens 9 sets a conjugate relationship between the focusing screen 7 and the photometry sensor 10 via a reflection surface in the pentagonal prism 8.

An eyepiece lens 11 is arranged behind a light exit portion of the pentagonal prism 8, and comprises a beam splitter 11a. The eyepiece lens 11 is used for observing the focusing screen 7 with an eye 15 of an observer. The beam splitter 11a comprises, e.g., a dichroic mirror for transmitting visible light therethrough and reflecting infrared light.

The main mirror 2, the focusing screen 7, the pentagonal prism 8, and the eyepiece lens 11 constitute a finder optical system.

The arrangement associated with a visual axis detection device will be explained below.

An image sensor 14 comprises two-dimensionally photoelectric conversion element arrays such as CCDs, and is arranged to be conjugate with a position near the pupil of the eyeball 15 of a photographer in association with an imaging lens 12. Infrared light-emitting diodes (to be abbreviated as IREDs hereinafter) 13a to 13f serve as illumination light sources, and are arranged around the eyepiece lens 11, as shown in FIG. 4B.

The visual axis detection device comprises the members 11a, 12, 13a to 13f, and 14.

A method of detecting the visual axis will be described below. First, the eyeball 15 of a photographer is illuminated with light emitted from the IREDs 13a to 13f. A light beam reflected by the eyeball 15 is reflected by the dichroic mirror 11a, and forms an eyeball image on the image sensor 14 via the imaging lens 12. Then, the rotational angle of the eyeball 15 is calculated by detecting the shift amount of an IRED reflected image based on light reflected by the surface of the cornea relative to the center of the pupil of the eyeball image, thereby detecting the observation position, i.e., the visual axis position of the photographer.

As for detailed processing for calculating the visual axis position on the basis of the output from the image sensor 14, a technique already disclosed in, e.g., Japanese Laid-Open Patent Application No. 3-109029 by the present applicant can be used, and a detailed description thereof will be omitted.

An LED 21 for superimpose has a high luminance, and can be observed in a bright object. Light emitted from the LED 21 is reflected by the main mirror 2 via a prism 22 for light projection, is deflected in a direction (optical axis direction) perpendicular to the focusing screen 7 by a small prism array 7a arranged on a display portion of the focusing screen 7, and reaches the eyeball 15 of the photographer via the pentagonal prism 8 and the eyepiece lens 11.

The small prism array 7a is formed in a frame shape at a plurality of positions (distance measurement points) corresponding to focusing point detection areas on the focusing screen 7, and these frames are illuminated with light emitted from the five corresponding LEDs 21 for superimpose (to be referred to as LED-L1, LED-L2, LED-C, LED-R1, and LED-R2 hereinafter).

With this arrangement, as can be seen from the field of view of the finder shown in FIG. 3, the distance measurement points (marks) 200, 201, 202, 203, and 204 glow in the field of view of the finder to display the corresponding focusing point detection areas (to be referred to as a superimpose display hereinafter).

Referring to FIG. 2, a front plate 17 holds the constituting elements of the finder and the focusing point detection device, and constitutes a mirror box. A high luminance LED 18 (LED-S) which is the same as the LEDs 21 is attached to the side surface of the front plate 17 with a light exit portion facing down. Light emitted from the LED 18 is incident on a mirror lens 19 which is similarly attached to the side surface of the mirror box and consists of a transparent resin. The mirror lens 19 has an upper convex surface 19a and a lower flat surface 19b, and the flat surface side is an aluminum-coated reflection surface. A light beam reflected by the reflection surface is guided toward the focusing screen 7, is deflected by a small prism 7b which is formed in a frame shape, and reaches the eyeball 15 of the photographer.

A parallelepiped frame observed on the upper left portion in the field of view of the finder shown in FIG. 3 is a visual axis input index 205 formed by the small prism 7b, and is used for executing a predetermined function, e.g., a stop-down function for stopping down the stop of the photographing lens 1 to an aperture size to be practically set so as to confirm the depth of field when the above-mentioned visual axis detection device detects that the visual axis of the photographer is present on or near the visual axis input index 205. In order to indicate to the photographer that the visual axis is input, the LED 18 is turned on for a predetermined period of time to display the visual axis input index 205 in the finder.

A panorama index 206 indicates an area to be photographed in a panorama photographing mode.

A field mask 23 forms a finder field area. An LCD 24 in the finder is used for displaying photographing information outside the field of view of the finder, and is illuminated with light emitted from an LED 25 (F-LED) shown in FIG. 1.

Light transmitted through the LCD 24 in the finder is deflected by a triangular prism 26 shown in FIG. 1 toward the eyeball 15 of the photographer, and the photographer can know various kinds of photographing information based on the display on the LCD 24.

A known mercury switch 27 is used for detecting the position of the camera.

The camera also includes a stop 31 arranged in the photographing lens 1, a stop drive device 32 including a stop drive circuit 111 (to be described later), a lens drive motor 33, and a lens drive member 34 consisting of, e.g., a drive gear. A photocoupler 35 detects the rotation of a pulse plate 36 which is interlocked with the lens drive member 34, and supplies a lens moving amount to a lens focusing point adjust circuit 110. The focusing point adjust circuit 110 drives the lens drive motor 33 by a predetermined amount on the basis of the information from the photocoupler 35 and lens drive amount information from the camera, thereby moving the photographing lens 1 to an in-focus position. A mount shoe 37 serves as a known interface between the camera and the lens.

A light-shielding plate 38 is arranged in front of the aperture of the camera, and shields a portion of the aperture to define a panorama photographing range in a panorama photographing mode. A plunger 39 is used for inserting/retracting the light-shielding plate 38 into/from the aperture portion, and inserts/retracts the light-shielding plate 38 by a known link mechanism.

Figure 4A:
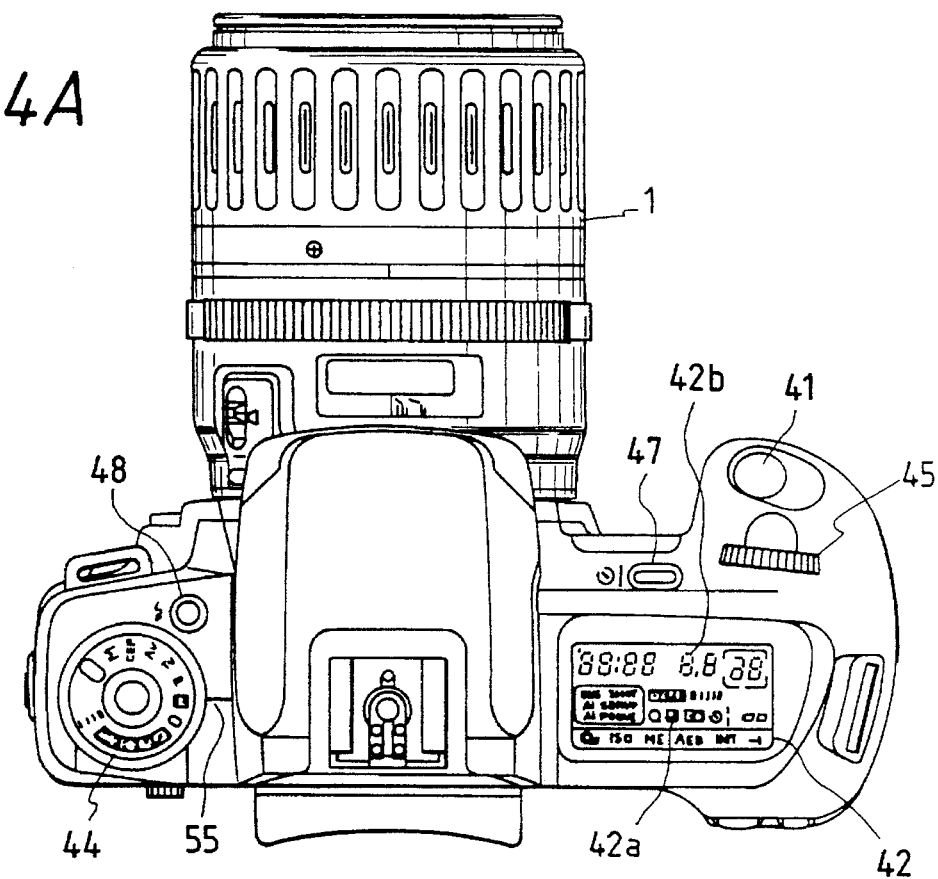
FIGS. 4A and 4B are respectively a top view and a rear view of the camera shown in FIG. 1.
Figure 4B:
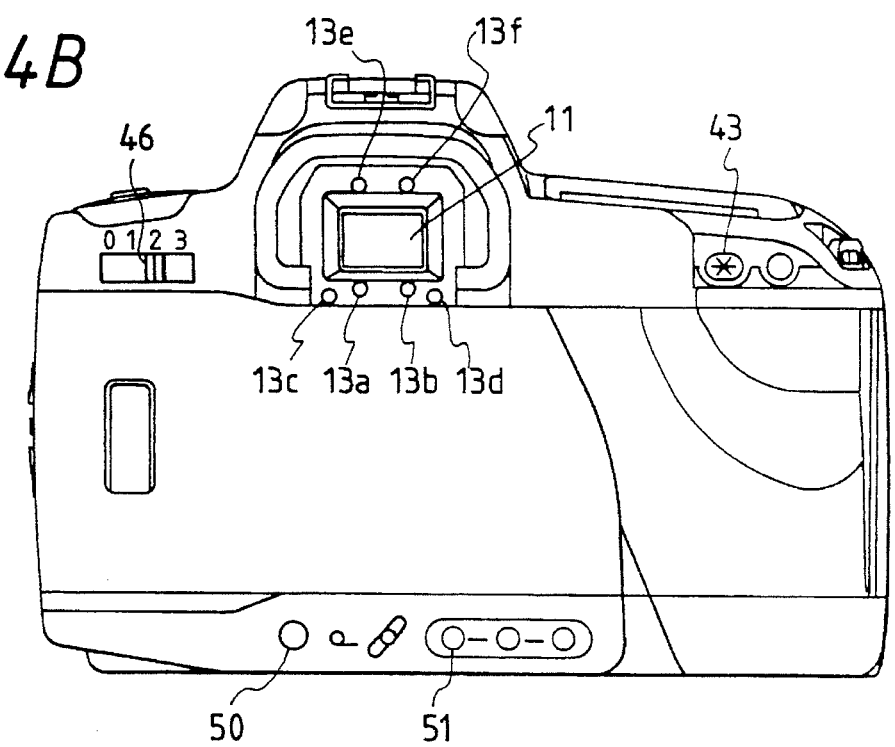

FIGS. 4A and 4B are respectively a top view and a rear view of the single-lens reflex camera shown in FIG. 1.

Referring to FIGS. 4A and 4B, the camera has a release button 41. An LCD 42 for monitor serves as an external monitor display device, and is constituted by a fixed segment display portion 42a and a 7-segment display portion 42b for displaying a variable numerical value. The camera also has an AE lock button 43 for holding a photometry value, and a mode dial 44 which is used for selecting, e.g., a photographing mode.

Figure 5:
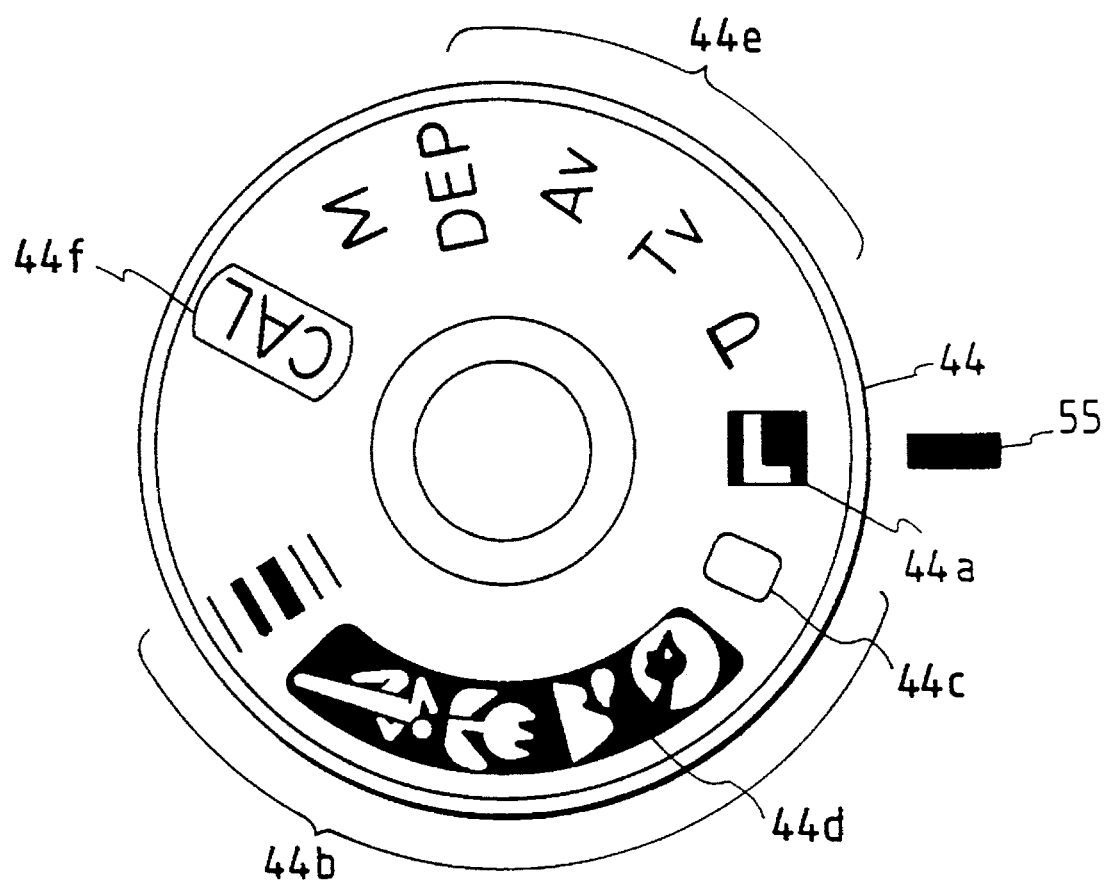
FIG. 5 is a plan view showing a mode dial of the camera shown in FIG. 1.

FIG. 5 is a detailed view of the mode dial 44. The dial 44 has a lock position 44a for rendering the camera inoperative, and a position 44b of an auto photographing mode in which the camera is controlled based on a predetermined photographing program or an operation function. In this mode, the dial 44 has a position 44c of a full auto mode as an auto photographing mode with a function of resetting already arbitrarily set photographing contents. In this mode, the above-mentioned visual axis detection is not performed. Also, the dial 44 has a position 44d of an image zone for which photographing programs suitable for scenes represented by icons are set. In this zone, four different modes, i.e., a portrait mode suitable for taking a portrait picture, a landscape mode suitable for taking a landscape picture and a commemoration picture, a close-up mode suitable for taking a close-up picture, and a sport mode suitable for taking a picture of a moving object, are set.

The dial 44 also has a position 44e of a manual photographing mode in which the photographer can set photographing contents, and this mode includes program AE, shutter priority AE, stop priority AE, field of depth priority AE, and manual exposure photographing modes. The dial 44 further has a "CAL" position 44f at which the camera is set in a calibration mode for calibrating visual axis detection, i.e., correcting a personal difference. Also, the dial 44 has an index 55 indicating the selected position.

Referring back to FIGS. 4A and 4B, an electronic dial 45 generates click pulses when it is rotated, thereby selecting a setting value which can be further selected in the mode selected by the mode dial 44. For example, when the shutter priority photographing mode is selected by the mode dial 44, the current shutter speed is displayed on the LCD 24 in the finder and the LCD 42 for monitor. When the photographer rotates the electronic dial 45 upon observation of this display, the shutter speed sequentially changes from the current value in accordance with the rotational direction of the dial 45.

A visual axis input selection switch 46 is used for arbitrarily selecting one of a plurality of camera control functions, which can be executed by visually observing the visual axis input index 205, and comprises a slide switch. When the switch 46 is set at position "0", "function for inputting visual axis" is selected as a control function operation; when it is at position "1", "confirm depth of field" described above is selected; when it is at position "2", "start self-timer" is selected; and when it is at position "3", "changeover panorama photographing mode" is selected.

A self button 47 is used for setting or canceling a self-timer photographing mode, and a stroboscope button 48 is used for popping up a built-in stroboscope.

Figure 6:
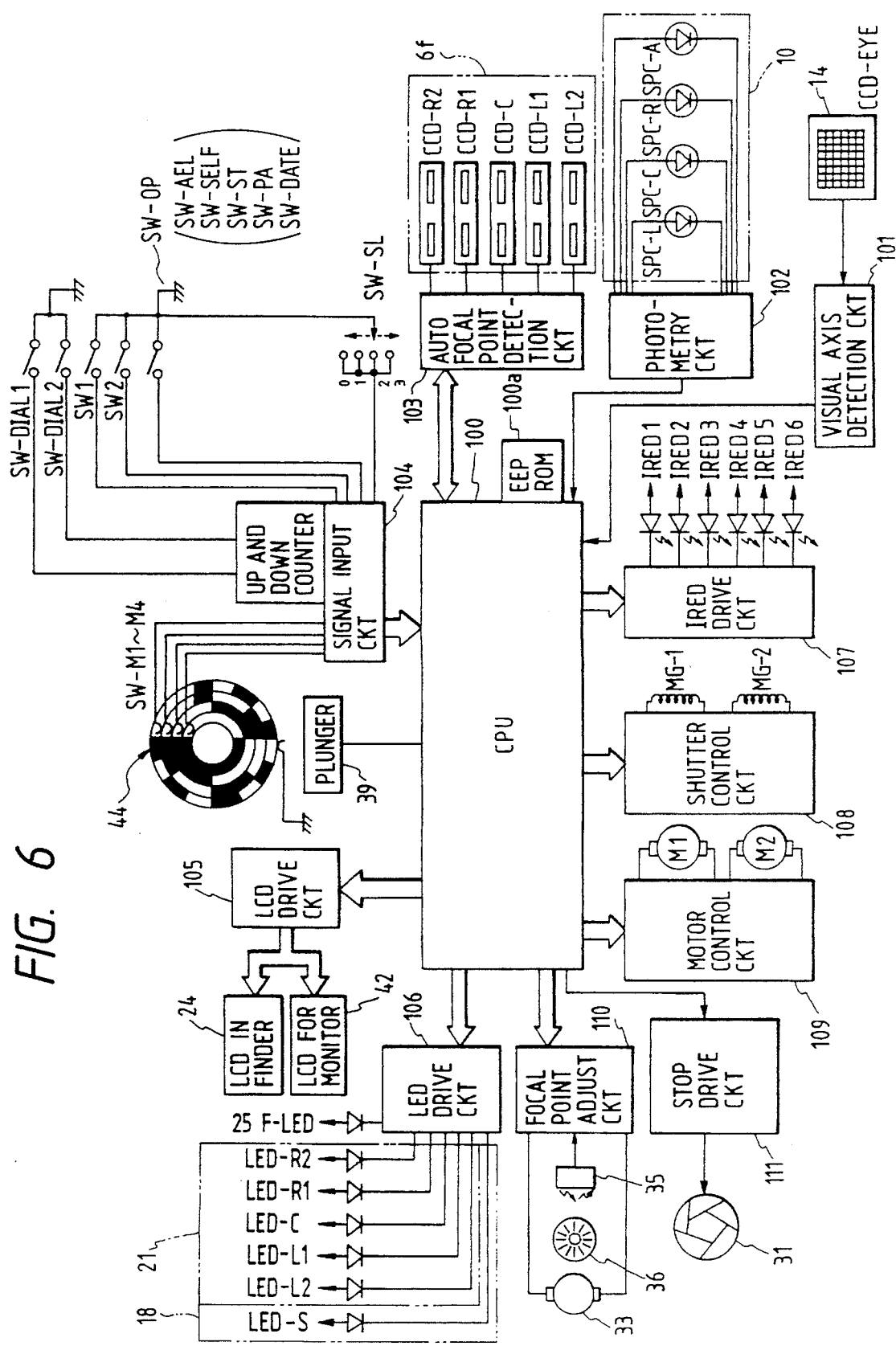
FIG. 6 is a block diagram showing main part of the electrical arrangement of the camera shown in FIG. 1.

FIG. 6 is a block diagram showing the electrical arrangement incorporated in the single-lens reflex camera with the above-mentioned arrangement, and the same reference numerals in FIG. 6 denote the same parts as in FIG. 1.

A central processing unit (to be referred to as a CPU hereinafter) 100 as a microcomputer incorporated in the camera main body is connected to a visual axis detection circuit 101, a photometry circuit 102, an auto focusing point detection circuit 103, a signal input circuit 104, an LCD drive circuit 105, an LED drive circuit 106, an IRED drive circuit 107, a shutter control circuit 108, a motor control circuit 109, and the plunger 39. The focusing point adjust circuit 110 and a stop drive circuit 111 arranged in the photographing lens 1 communicate signals via the mount shoe 37 shown in FIG. 1.

An EEPROM 100a connected to the CPU 100 has a storage function of visual axis correction data used for correcting a personal difference of the visual axis as storage means.

The visual axis detection circuit 101 A/D-converts a signal representing an eyeball image from the image sensor 14 (CCD), and transmits A/D-converted image information to the CPU 100. The CPU 100 extracts feature points of the eyeball image required for visual axis detection in accordance with a predetermined algorithm, and calculates the visual axis of the photographer on the basis of the positions of the feature points, as will be described later.

The photometry circuit 102 amplifies a signal from the photometry sensor 10, performs log compression and A/D conversion Of the amplified signal, and then transmits the A/D-converted signal to the CPU 100 as luminance information of the sensor. The photomerry sensor 10 is constituted by four photodiodes for respectively performing photometry of four areas, i.e., a photodiode SPC-L for performing photometry of a left area 210 including the left distance measurement points 200 and 201 in the field of view of the finder shown in FIG. 3, a photodiode SPC-C for performing photometry of a center area 211 including the distance measurement point 202, a photodiode SPC-R for performing photomerry of a right area 212 including the right distance measuring points 203 and 204, and a photodiode SPC-A for performing photomerry of a peripheral area 213 of these areas.

The line sensor 6f is a known CCD line sensor constituted by the five line sensors CCD-L2, CCDL-1, CCD-C, CCD-R1, and CCD-R2 corresponding to the five distance measurement points 200 to 204 in the frame, as shown in FIG. 3.

The auto focusing point detection circuit 103 A/D-converts a voltage obtained from the line sensor 6f, and supplies the A/D-converted voltage to the CPU 100.

A switch SW-1 is a switch which is turned on at the first stroke position of the release button 41 to start a photometry operation, AF operation, visual axis detection operation, and the like. A switch SW-2 is a release switch which is turned on at the second stroke position of the release button 41. Switches SW-OP are switches (SW-AEL, SW-SELF, SW-ST, SW-PA, SW-DATE) which are turned on upon pushing of the AE lock button 43, the self button 47, the stroboscope button, and the like, and are generally described as SW-OP. A switch SW-SL is a slide switch which corresponds to the visual axis input function selection switch 46.

Switches SW-DIAL1 and SW-DIAL2 are dial switches arranged in the electronic dial 45 already described above, and the outputs from these switches are input to an up/down counter of the signal input circuit 104 to count the rotational click amount of the electronic dial 45. Also, switches SW-M1 to SW-M4 are dial switches arranged in the mode dial 44 described above.

The status signals of these switches are input to the signal input circuit 104, and are transmitted to the CPU 100 via a data bus.

The LCD drive circuit 105 comprises a known arrangement for display-driving the LCD as a liquid crystal display element, and can simultaneously display information such as an aperture value, shutter speed, selected photographing mode, and the like on the LCD 42 for monitor and the LCD 24 in the finder.

The LED drive circuit 106 ON/OFF-controls the LED (F-LED) 25 for illumination, the LED (LED-S) 18 for superimpose, and the LEDs 21.

The IRED drive circuit 107 selectively turns on the infrared light-emitting diodes (IRED1 to IRED6) 13a to 13f in correspondence with the condition of the camera.

The shutter control circuit 108 controls magnets MG-1 and MG-2 for respectively driving front and rear curtains upon energization to expose the photosensitive member with a predetermined amount of light. The motor control circuit 109 controls a motor M1 for winding up and rewinding a film and a motor M2 for charging the main mirror 2 and the shutter 4.

The shutter control circuit 108 and the motor control circuit 109 operate a series of release sequences of the camera.

Figure 7A:
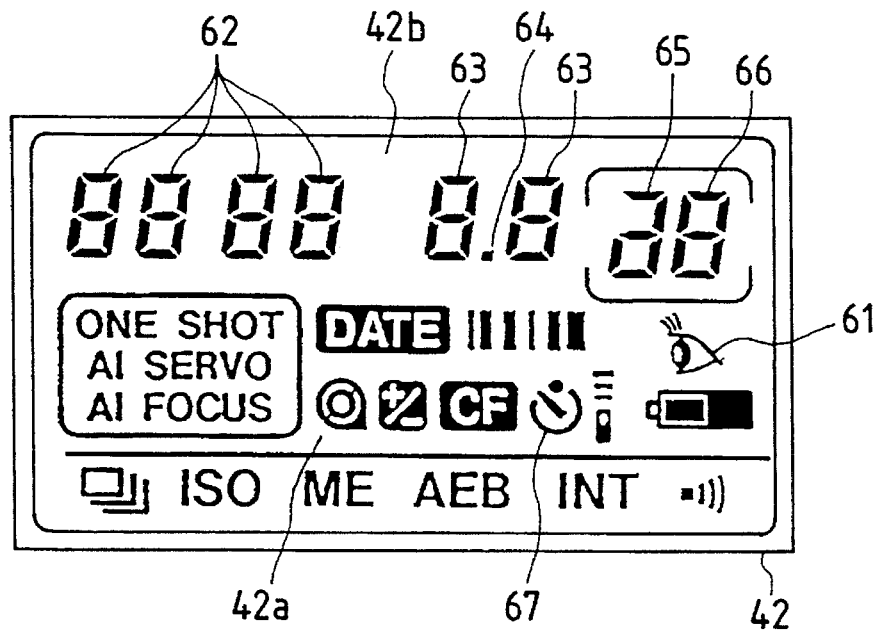
FIGS. 7A and 7B are views for explaining various display states on an LCD for monitor and an LCD in the finder of the camera shown in FIG. 1.
Figure 7B:
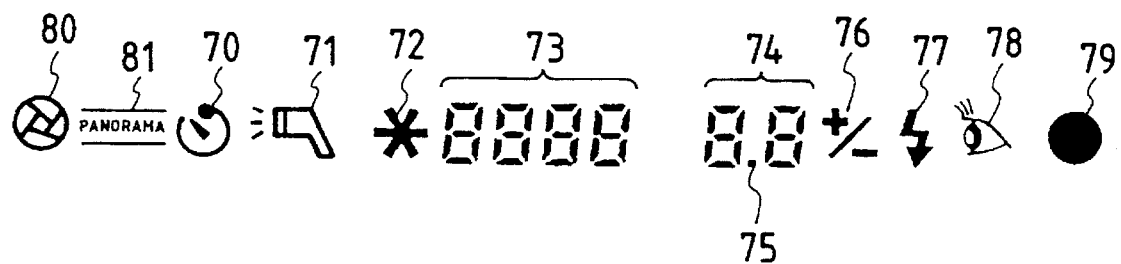

FIGS. 7A and 7B show the contents of all the display segments of the LCD 42 for monitor and the LCD 24 in the finder shown in FIG. 3 and FIGS. 4A and 4B.

Referring to FIG. 7A, the fixed segment display portion 42a has a visual axis input mode display portion 61 for indicating that the visual axis detection is performed, and the AF operation of the camera and the photographing operation such as selection of the photographing mode are controlled using visual axis information, in addition to known photographing mode displays. The 7-segment display portion 42b for displaying a variable numerical value is constituted by a 4-digit 7-segment portion 62 for displaying the shutter speed, a 2-digit 7-segment portion 63 and a decimal point portion 64 for displaying the aperture value, a limited numerical value display segment portion 65 and a 1-digit 7-segment portion 66 for displaying a film count, a self-timer mode mark 67, and the like.

Referring to FIG. 7B, the LCD 24 displays a stop-down mark 80, a panorama mark 81, a self-timer mark 70, a stroboscope mark 71, an AE lock mark 72, display segment portions 73, 74, and 75 which are the same as the above-mentioned shutter speed display portion and aperture value display portion, an exposure correction setting mark 76, a stroboscope charged mark 77, a visual axis input mark 78 indicating that a visual axis input state is selected, and an in-focus mark 79 indicating the in-focus state of the photographing lens 1.

The operation of the above-mentioned single-lens reflex camera will be described below with reference to FIGS. 8 to 12.

The "confirm depth of field" operation based on the visual axis input upon selection of position "1" of the visual axis input function selection switch 46 will be described below with reference to the flow chart in FIG. 8.

When the power switch of the camera is turned on in step 100, the state of the switch SW1, which is turned on at the first stroke position of the release button 41 is checked in step 101. If the switch SW1 is OFF in step 101, this detection is repeated. Thereafter, when the switch SW1 is turned on, the flow advances to step 102 to detect the focusing point of an object image using the auto focusing point detection circuit 103.

In step 103, if it is determined based on the detection result in step 102 that an in-focus state is not attained, the CPU 100 supplies a signal to the lens focusing point adjust circuit 110 to drive the photographing lens 1 by a predetermined amount. In other words, in-focus control of the photographing lens 1 is performed. Upon completion of the control of the photographing lens, the state of the switch SW1 is checked again in step 104. If the switch SW1 is OFF, the flow advances to step 113; otherwise, the flow advances to step 105. In this case, it is assumed that the switch SW1 is ON, and the flow advances to step 105.

Figure 9:
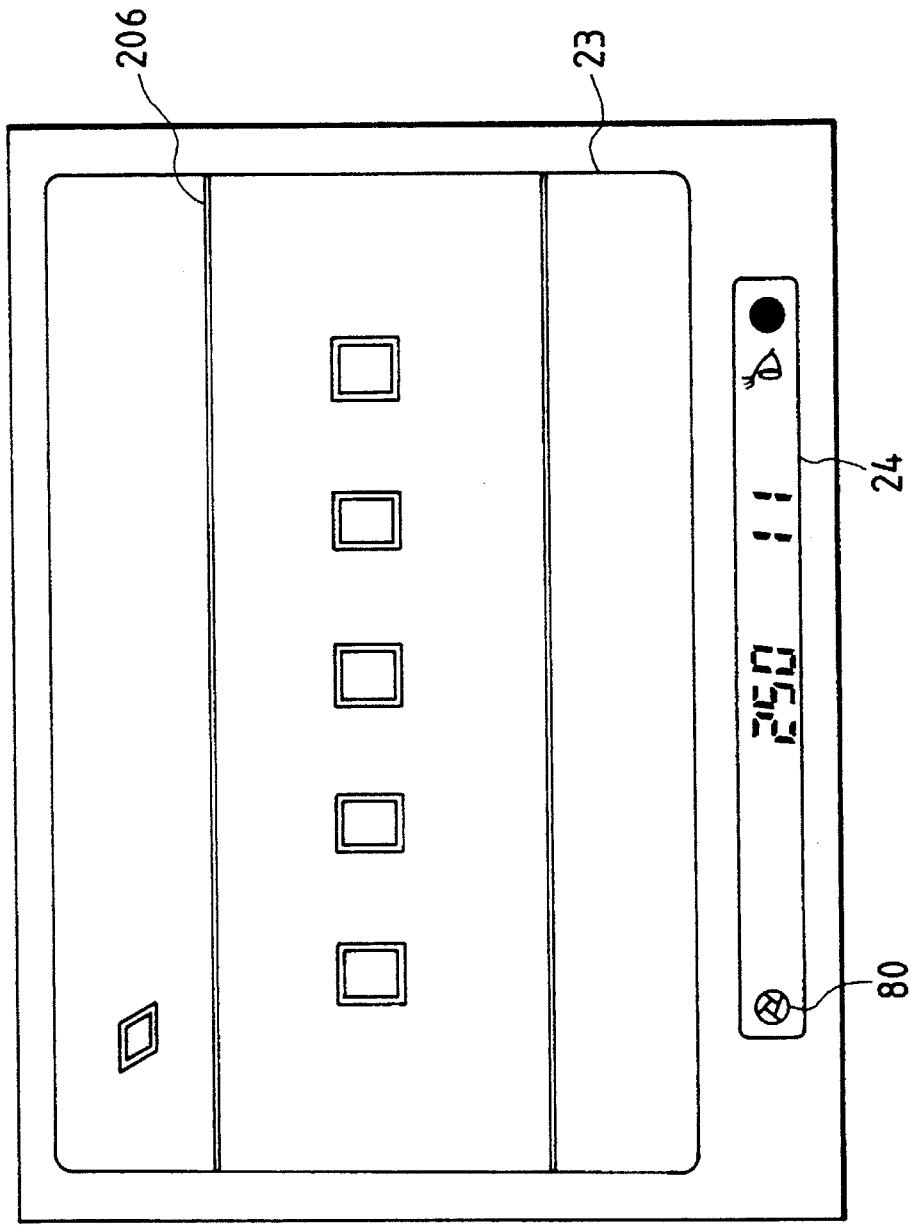
FIG. 9 is a plan view showing the display state in the finder upon execution of the operation shown in FIG. 8.

In step 105, the CPU 100 transmits a signal to the photomerry circuit 102 to perform photomerry. At this time, an exposure value is calculated based on photomerry performed on the photometry areas 210 to 213 including the distance measurement point set in an in-focus state, and at the same time, the CPU 100 supplies a signal to the LED drive circuit 106 to turn on the LED (F-LED) 25 for illumination. The LCD drive circuit 105 displays the 7-segment portions 73 to 75 of the LCD 24 in the finder, and also displays the stop-down mark 80 which indicates that the function "confirm depth of field" is selected by the visual axis input function selection switch 46. FIG. 9 shows the finder display state at that time. The calculated aperture value at that time is "F=11".

The flow then advances to step 106 to check the state of the release switch SW2 in turn. As a result, if the switch SW2 is ON, the flow advances to step 107. In step 107, the CPU 100 supplies signals to the shutter control circuit 108, the motor control circuit 109, and the stop drive circuit 111 to complete a series of release sequence operations.

More specifically, the motor M2 is energized to move the main mirror 2 upward, and the stop 31 is stopped down. Thereafter, the magnet MG-1 is energized to open the front curtain of the shutter 4. The aperture value of the stop 31 and the shutter speed of the shutter 4 are determined on the basis of the exposure value detected by the photometry circuit 102 and the sensitivity of the film 5. After an elapse of a predetermined shutter time, the magnet MG-2 is energized to close the rear curtain of the shutter 4. Upon completion of exposure on the film 5, the motor M2 is energized again to perform a mirror-down operation and a shutter charge operation. At the same time, the motor M1 is energized to feed the film by one frame, thus completing a series of release sequence operations.

In step 108, in order to inhibit a new focusing point adjust operation while the release button 41 is held at the first stroke position, the state of the switch SW1 is detected. While the switch SW1 is ON, step 108 is repeated. Thereafter, when the OFF state of the switch SW1 is detected, the flow returns to step 101.

If it is determined in step 106 that the release switch SW2 is OFF, the flow advances to step 109 to check if a stop-down operation to be performed in the step described later has already been performed. If YES in step 109 (a stopped-down condition has already been set), the flow returns to step 104 to detect the state of the switch SW1 again.

However, if NO in step 109, the flow advances to step 110, and the visual axis detection circuit 101 detects the visual axis position of a finder observer. In step 111, it is checked if the detected visual axis position corresponds to the visual axis input index 205 or a position near it at a predetermined number of times or stays thereon for a predetermined period of time. If NO in step 111, the flow returns to step 104. However, if YES in step 111, the flow advances to step 112.

In step 112, the CPU 100 supplies a signal to the LED drive circuit 106 to cause the LED 18 (LED-S) to illuminate the visual axis input index 205 for a predetermined period of time so as to perform a confirmation display indicating that the visual axis input is accepted. In addition, a control signal is generated on the basis of an aperture value calculated based on the luminance information of an object obtained by the photometry circuit 102 and a pre-set shutter speed, or on the basis of a pre-set aperture value, and is supplied to the stop drive circuit 111 to drive the stop 31 to a predetermined aperture size (to F11 when a display shown in FIG. 9 is made), thereby forming an object image on the focusing screen 7 on the basis of a light beam under the same condition as in the photographing operation. Therefore, the depth of field can be confirmed on the finder.

Upon completion of the stop-down operation, the flow returns to step 104, and the state of the switch SW1 is detected. If only the switch SW1 is kept ON, the stopped-down condition is held. On the other hand, if the switch SW1 is turned off, the flow advances to step 113 to check if the stopped-down condition has already been set. If YES in step 113, the flow advances to step 114 to reopen the stop 31. Thereafter, the flow returns to step 101 to detect the state of the switch SW1, as described above.

In the above-mentioned operation, once the stop-down operation is performed based on the visual axis input, the stopped-down condition is held while "SW1=ON". Alternatively, after an elapse of a predetermined timer time, the stop may be automatically reopened.

Figure 10:
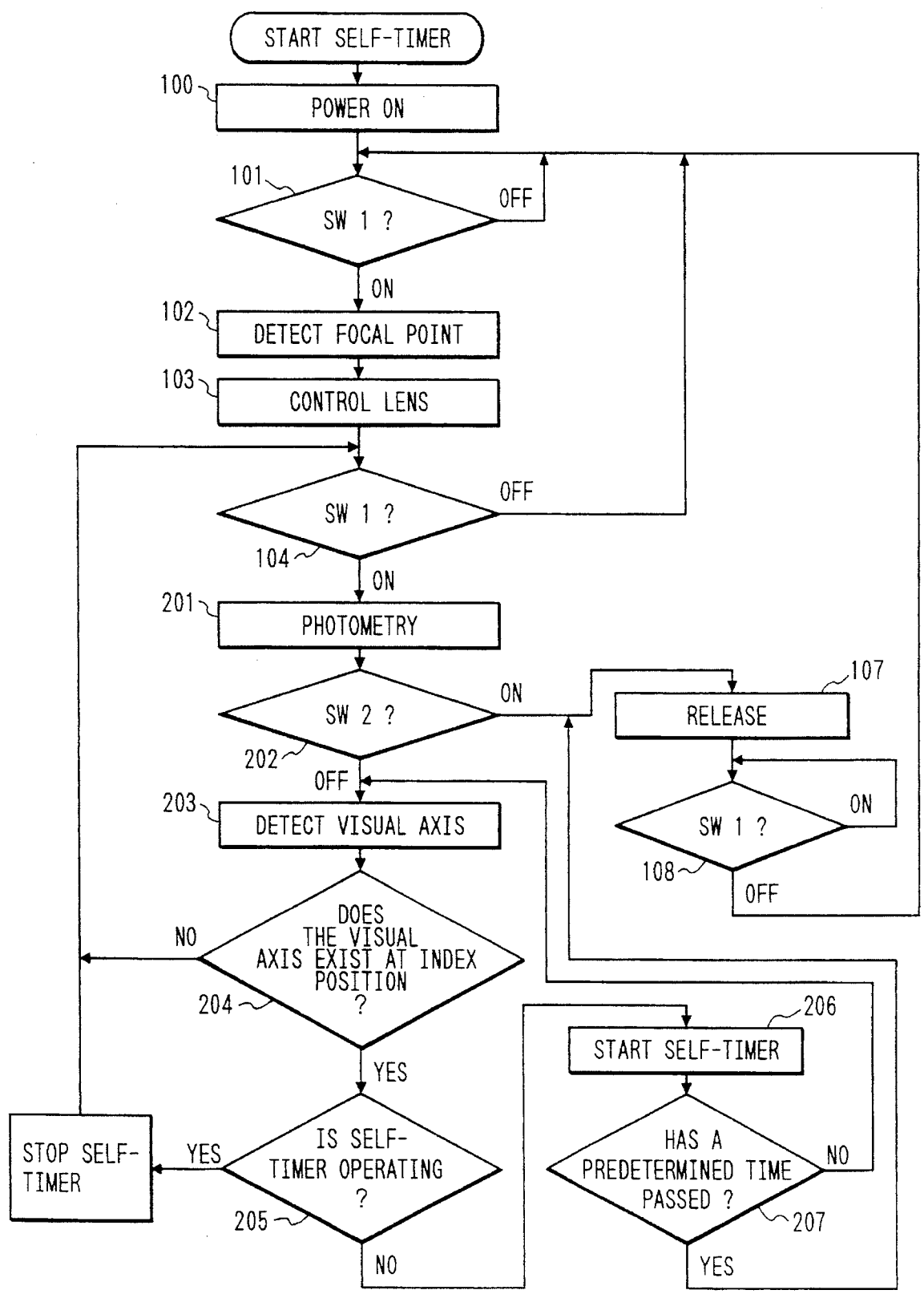
FIG. 10 is a flow chart showing the operation executed when the visual axis input function is set to be "start self-timer" in the first embodiment of the present invention.

The "start self-timer" operation based on the visual axis input upon selection of position "2" by the visual axis input function selection switch 46 will be described below with reference to the flow chart in FIG. 10.

The same reference numerals in FIG. 10 denote the same steps as in FIG. 8, a detailed description thereof will be omitted, and only the characteristic steps will be described below.

Figure 8:
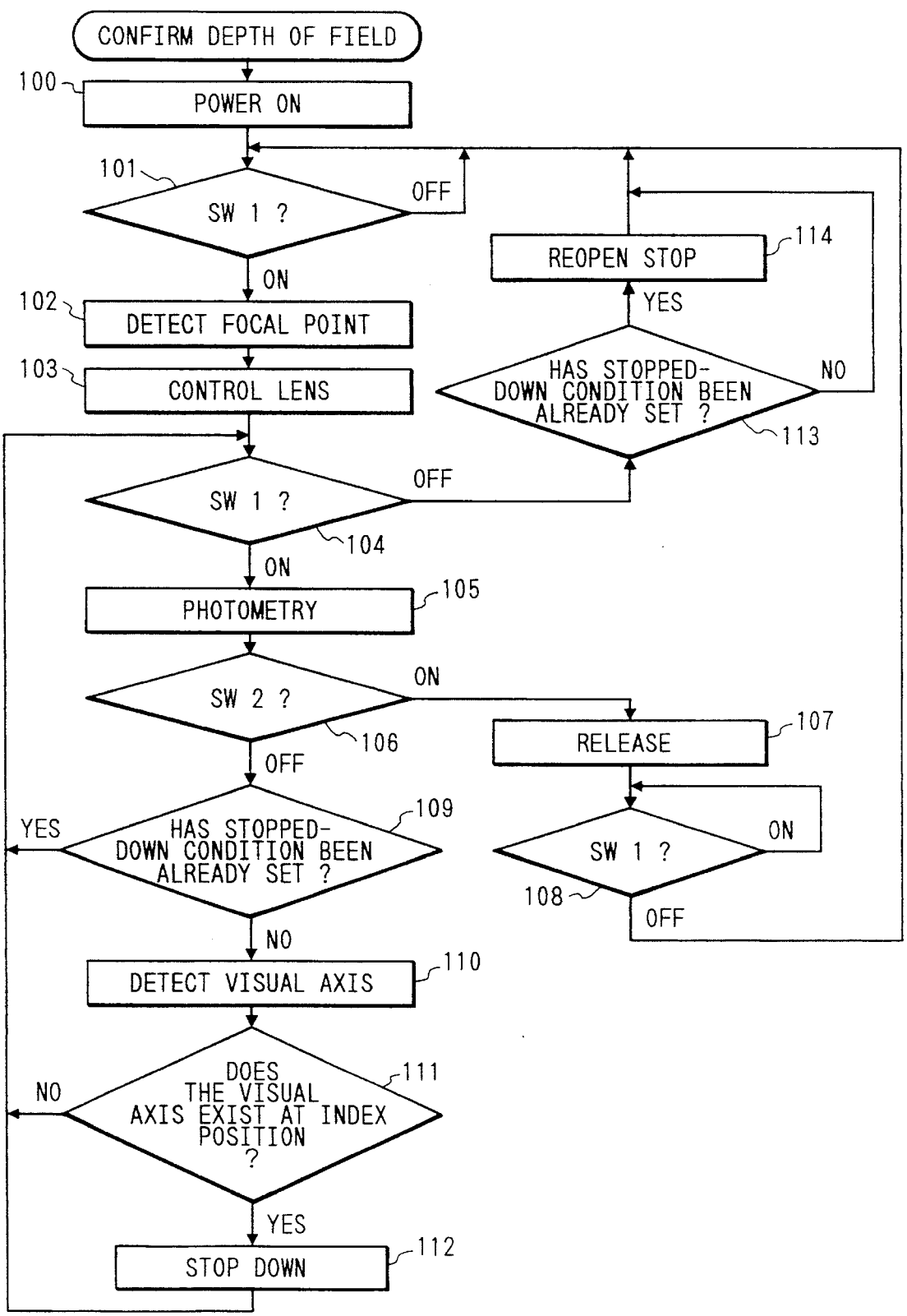
FIG. 8 is a flow chart showing the operation executed when a visual axis input function is set to be "confirm depth of field" in the first embodiment of the present invention.

Since steps 100 to 104 are the same as those in FIG. 8, a description thereof will be omitted. If it is determined in step 104 that the switch SW1 is ON, the flow advances to step 201. In step 201, photomerry is performed in substantially the same manner as in step 105, except that the self-timer mark 70 is displayed on the LCD 24 in the finder, thus indicating that "start self-timer" is selected based on the visual axis input.

In step 202, the state of the release switch SW2 is checked. If the release switch SW2 is OFF, the visual axis position is detected in step 203, and upon completion of detection, the flow advances to step 204 to check if the visual axis position is present on or near the visual axis input index 205. If YES in step 204, the flow advances to step 205; otherwise, the flow returns to step 104.

In step 205, it is checked if the self-timer is already operating. If NO in step 205, the flow advances to step 206. In step 206, the CPU 100 supplies a signal to the LED drive circuit 106 to cause the LED 18 (LED-S) to illuminate the visual axis input index 205 for a predetermined period of time so as to perform a confirmation display indicating that the visual axis input is accepted. In addition, a known self-timer operation is started, and the self-timer mark 70 on the LCD 24 in the finder is switched from an ON state to a flickering state.

Note that the visual axis input index 205 is turned off after it is turned on for a predetermined period of time. Alternatively, the index 205 may be controlled to flicker after the visual axis input is detected. In addition, a tone generator may generate a tone to indicate that the self-timer is operating.

When the self-timer is started, the flow advances to step 207 to check if a predetermined period of time (e.g., 10 second) has passed in the self-timer. If YES in step 207, the flow advances to step 107 to perform the above-mentioned release sequence operations.

If NO in step 207, the flow returns to step 203 to perform visual axis detection. If it is detected again that the visual axis position is present near the visual axis input index 205 (step 204), it is determined in turn in step 205 that the self-timer is operating. Therefore, the flow advances to step 208 to stop the self-timer. The flow then returns to step 104 to check the state of the switch SW1.

In this embodiment, even when the self-timer is started based on the visual axis input, if the visual axis is directed toward the visual axis input index 205 again, the self-timer can be stopped.

In this manner, even when a function is set based on the visual axis input, the function can be canceled by directing the visual axis toward the visual axis input index 205 or a position near it. The same applies to the above-mentioned selection of "confirm depth of field".

As described above, even when the self-timer mode is not set in advance, the self-timer can be started by the visual axis input (directing the visual axis toward the index) when it is required, and can be stopped by the visual axis input again.

The self-timer mode mark 67 on the LCD 42 for monitor indicates that the self-timer photographing mode is set, and the self-timer mark 70 on the LCD 24 in the finder indicates that "start self-timer" is set by the visual axis input. Therefore, these marks have different meanings. The self-timer can be started by the visual axis input independently of the above-mentioned self-timer photographing mode or the normal photographing mode as long as the visual axis input function selection switch 46 is set at position "2".

Figure 11:
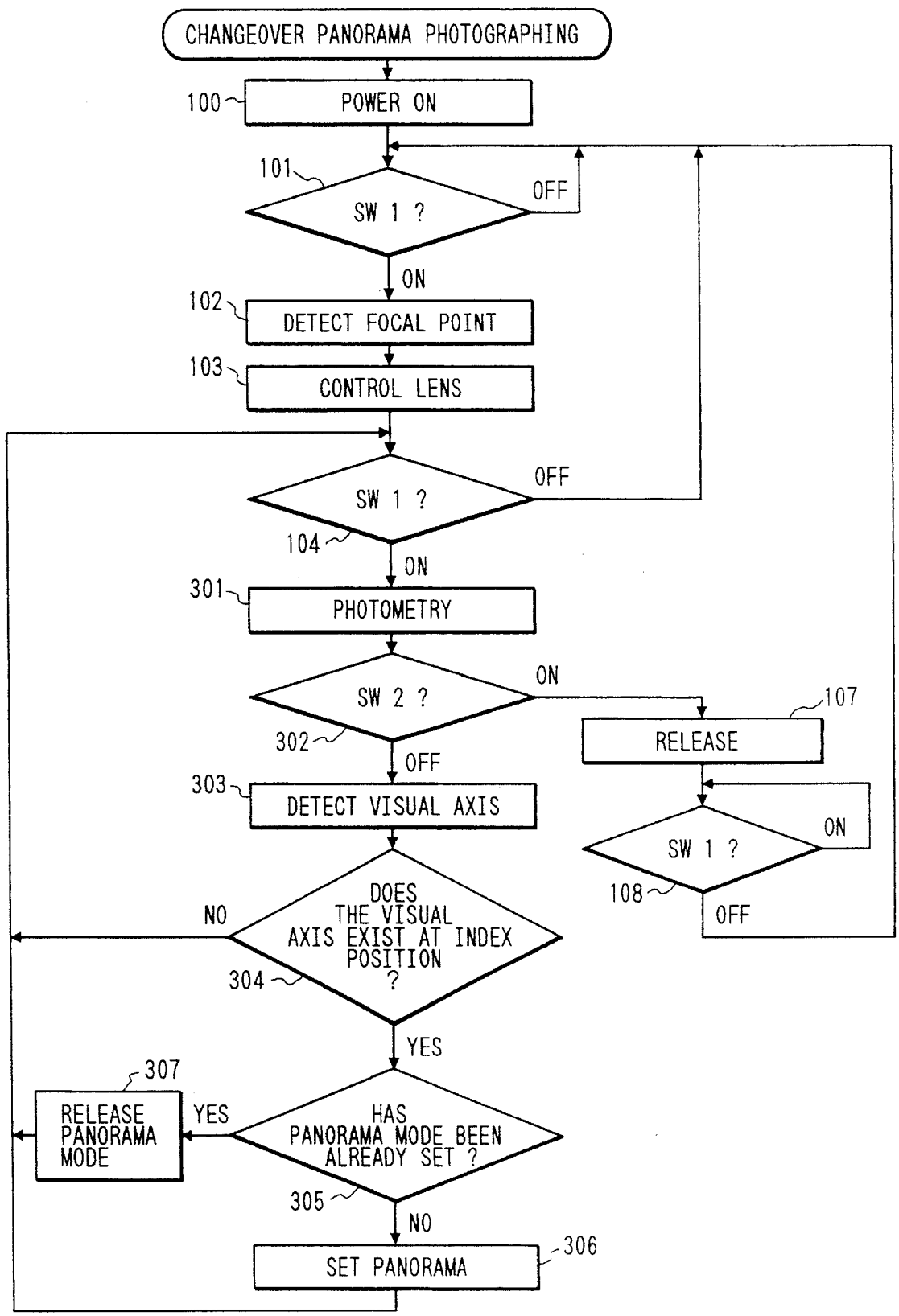
FIG. 11 is a flow chart showing the operation executed when the visual axis input function is set to be "changeover panorama photographing" in the first embodiment.

The "changeover panorama photographing" operation based on the visual axis input upon selection of position "3" by the visual axis input function selection switch 46 will be described below with reference to the flow chart in FIG. 11.

The same reference numerals in FIG. 11 denote the same steps as in FIG. 8, a detailed description thereof will be omitted, and only the characteristic steps will be described below.

Since steps 100 to 104 are the same as those in FIG. 8, a description thereof will be omitted. If it is determined in step 104 that the switch SW1 is ON, the flow advances to step 301. In step 301, photomerry is performed in substantially the same manner as in step 105, except that the panorama mark 81 is displayed on the LCD 24 in the finder, thus indicating that "changeover panorama photographing mode" is selected based on the visual axis input.

In step 302, the state of the release switch SW2 is checked. If the switch SW2 is OFF, the visual axis position is detected in step 303. Upon completion of detection, the flow advances to step 304. It is checked in step 304 if the visual axis position is present on or near the visual axis input index 205. If YES in step 304, the flow advances to step 305; otherwise, the flow returns to step 104.

In step 305, it is checked if the panorama photographing mode has already been set. If NO in step 305, the flow advances to step 306. In step 306, the CPU 100 supplies a signal to the LED drive circuit 106 to cause the LED 18 (LED-S) to illuminate the visual axis input index 205 for a predetermined period of time so as to perform a confirmation display indicating that the visual axis input is accepted. In addition, the plunger 39 is energized to insert the light-shielding plate 38 shown in FIG. 1 in the aperture by a predetermined amount, thus defining the panorama photographing frame. Furthermore, the panorama mark 81 on the LCD 24 in the finder is switched from an ON state to a flickering state to alarm a photographer that the panorama photographing mode is set, thus urging a photographer to focus on an object within the panorama index 206 in the finder.

In this case, in place of illuminating the visual axis input index 205 for a predetermined time, the index 205 may be controlled to flicker, or the color of the LED 18 (LED-S) may be switched from, e.g., red to green to indicate that the panorama photographing mode is set. Since the visual axis input index 205 is arranged outside the panorama photographing range indicated by the panorama index 206, even when an alarm display is made in the panorama photographing mode, it does not disturb framing. In addition, an alarm to a photographer can be generated more effectively than in a case wherein the alarm display is made on the LCD 24 in the finder, which falls outside the field of view, resulting in an optimal display.

If it is determined in step 305 that the panorama mode has already been set, the flow advances to step 307 to perform a confirmation display indicating that the visual axis input is accepted, in the same manner as in step 306 above. In addition, the plunger 39 is energized to retract the light-shielding plate 38 from the aperture in turn. Furthermore, the panorama mark 81 is switched from the flickering state to the ON state. When an alarm display is made using the visual axis input index 205 to indicate that the panorama photographing mode is set, it is turned off.

As described above, the panorama photographing mode can be set/canceled by directing the visual axis toward the visual axis input index.

The "function for inputting a visual axis is invalid" operation upon selection of position "0" by the visual axis input function selection switch 46 will be described below with reference to the flow chart in FIG. 12.

The operation in this case is substantially the same as that in steps 100 to 108 in the flow chart in FIG. 8. The characteristic difference is that photomerry is performed in step 401 but none of the visual axis input function marks are displayed on the LCD 24 in the finder. If it is determined in step 402 that the release switch SW2 is OFF, the flow returns to step 104 to detect the state of the switch SW1. Thus, the visual axis input function does not work.

Figure 13B:
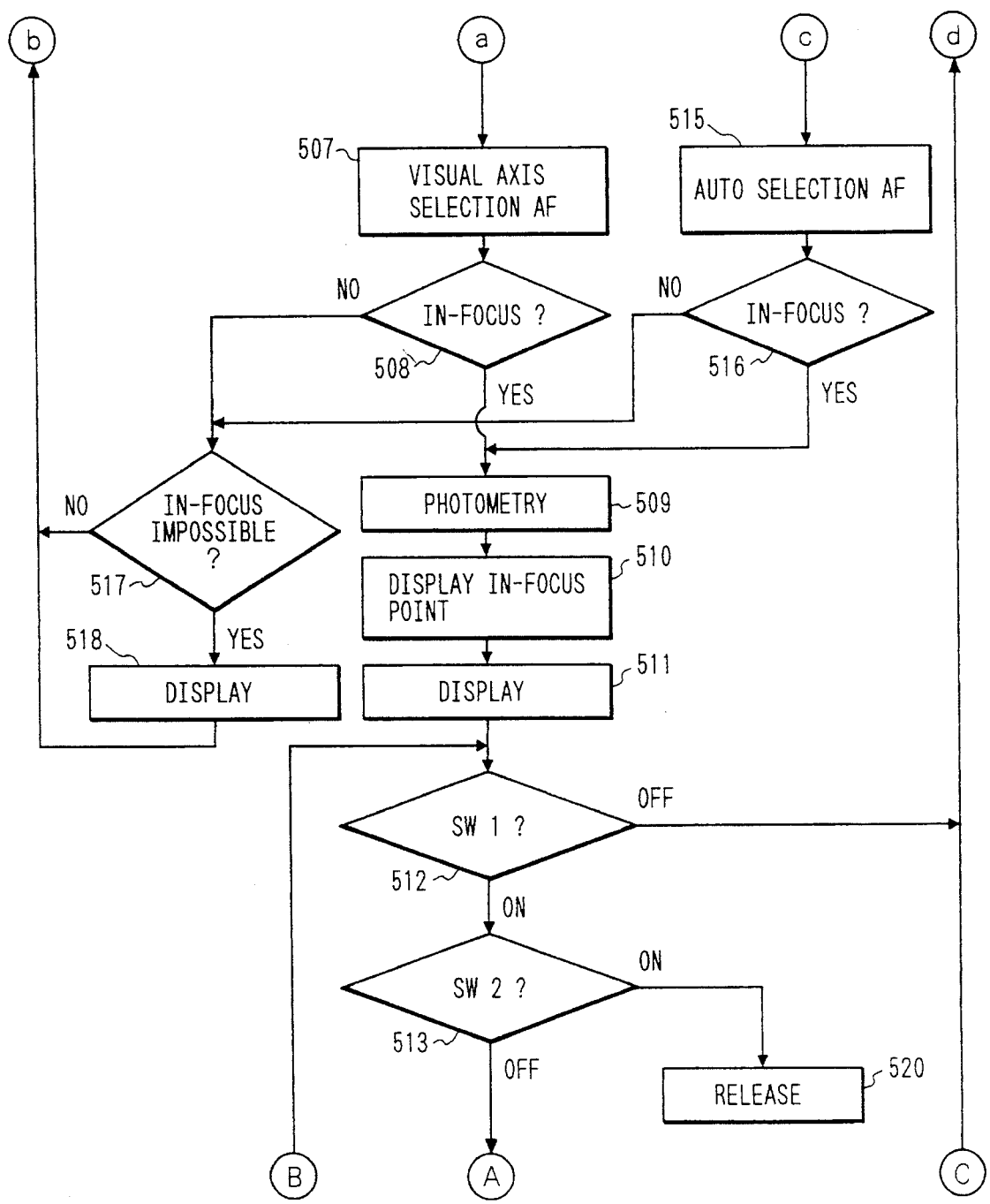
FIG. 13 is comprised of FIGS. 13A and 13B illustrating flow charts showing the operation executed when a visual axis input function is set to be "confirm depth of field" in the second embodiment of the present invention.
Figure 14:
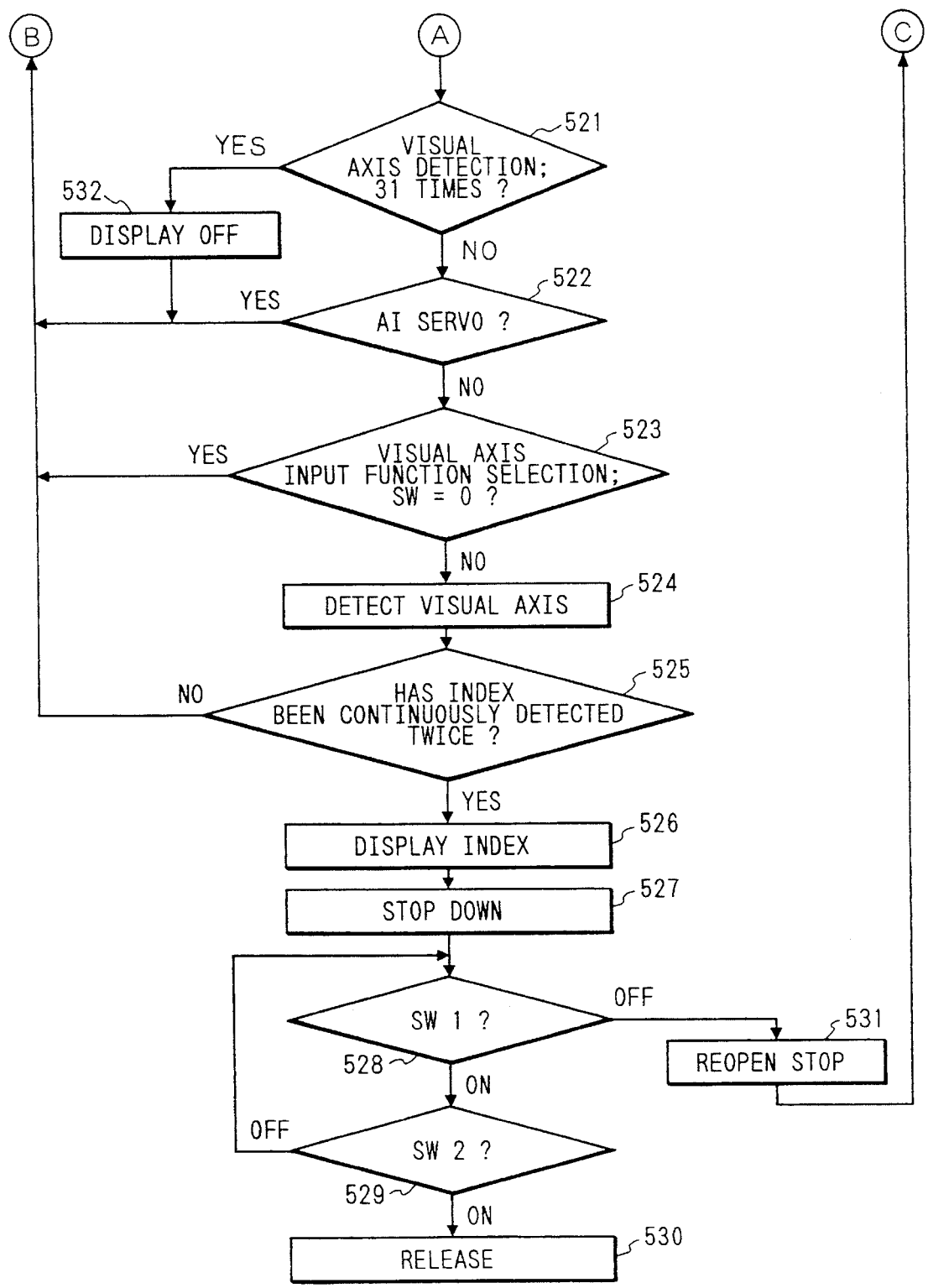
FIG. 14 is a flow chart showing the operation to be continued from that shown in FIGS. 13A and 13B.

FIGS. 13A, 13B and 14 are flow charts showing the operations of a principal part of the second embodiment in which the present invention is applied to a single-lens reflex camera. In the second embodiment, a visual axis input AF mode for selecting at least one of a plurality of distance measurement points based on the visual axis input, and a visual axis input function for executing a predetermined function by gazing the visual axis input index are executed together in a series of sequences up to the release operation of the camera. Note that the mechanical and electrical arrangements of the single-lens reflex camera are the same as those in the first embodiment, and are not illustrated but will be described using the same reference numerals in the description of the operations.

The "confirm depth of field" operation based on the visual axis input upon selection of position "1" by the visual axis input function selection switch 46 will be described below with reference to the flow charts in FIGS. 13A through 14.

When the mode dial 44 shown in FIG. 5 is rotated and is unlocked from the lock position 44a to turn on the power switch, the flow advances from step 500 to step 501. In step 501, the state of the switch SW1 is checked. If the switch SW1 is OFF, detection of the ON state of the switch SW1 is repeated until a power-ON timer reaches a time-out state. Thereafter, when the switch SW1 is turned on, the CPU 100 supplies a signal to the photometry circuit 102 in step 502 to measure object luminances corresponding to the four areas 210 to 213 in the finder. In step 503, the shutter speed and the aperture value which are calculated based on the photometry values, the ISO sensitivity of the film, the f-number of the attached lens, and the like are displayed on the LCD 24 in the finder and the LCD 42 for monitor.

In step 504, the visual axis detection circuit 101 detects the visual axis position of a finder observer. In this case, the visual axis detection is performed to detect one of the distance measurement positions (marks) 200 to 204 arranged in the field of view of the finder. It is then checked in step 505 if the visual axis detection has been successful. If YES in step 505, one of the distance measurement points 200 to 204 is illuminated by the LED 21 for superimpose to inform the selected distance measurement point to the photographer in step 506.

Upon completion of the display, the flow advances to step 507, focusing point detection (visual axis selection AF) based on the distance measurement point (focusing point detection area) selected in the above-mentioned visual axis detection is performed. In this case, the defocus amount of an object image is detected by the auto focusing point detection circuit 103, and in-focus control of the photographing lens 1 is executed based on the detected value. It is checked in step 508 if an in-focus state is attained by the in-focus control. If YES in step 508, the in-focus control operation is stopped, and the focus position of the photographing lens 1 is locked. In step 509, at the locked focus position, the luminance values of the respective areas in the finder are measured by the multi-split photomerry sensor 10, and the measured values are also locked.

In step 510, one of the distance measurement point marks 200 to 204 is illuminated by the LED 21 for superimpose with a brightness corresponding to the distance measurement point on the basis of the photometry values obtained in step 509, thus displaying an in-focus point. In step 511, the shutter speed, the aperture value, and the like obtained based on the photomerry values in step 509 are also displayed on the LCD 24 in the finder and the LCD 42 for monitor. These shutter speed and aperture value are used for controlling the brightness of the LED 25 (F-LED) for illumination on the basis of the photomerry value of the peripheral area 213 unlike the display of the in-focus point in step 510.

In step 512, it is checked based on the state of the switch SW1 if the locked focus position and photometry values are held as the photographing condition. If the switch SW1 is ON, the flow advances to step 513 to check based on the state of the release switch SW2 if the exposure operation is performed under the held condition.

If the release switch SW2 is ON, the flow advances to step 520 to start the release sequence. In this sequence, a series of film exposure operations such as retraction of the sub mirror 3, and driving of the stop driving circuit 111 and the shutter control circuit 108, and a reset operation of these circuits are performed.

On the other hand, if it is determined in step 505 that the visual axis detection has been successful, the flow advances to step 507 to perform visual axis selection AF via step 506. However, if the photographer does not watch the field of view of the finder, or wears eyeglasses which cut infrared rays and do not allow the visual axis detection device to perform detection, it is determined that the visual axis detection has been unsuccessful, and the flow advances to step 514 in this case.

In step 514, the number of times of unsuccessful detection is detected. The number of times of detection in this case is four, and if the number of times of detection is three or less, the flow returns to step 504 to detect the visual axis again. If the fourth visual axis detection is unsuccessful, the flow advances to step 515, and the camera automatically determines the distance measurement point in correspondence with an object distance to adjust the focusing point (auto selection AF). In this case, as in step 507 above (visual axis selection AF), the auto focusing point detection circuit 103 detects the defocus amount of an object image, and in-focus control of the photographing lens 1 is executed.

In step 516, it is checked if the in-focus state is attained by the in-focus control. If YES in step 516, the in-focus control operation is stopped, and the focus position of the photographing lens 1 is locked. Then, the flow advances to step 509 described above. However, if NO in step 516, it is checked in step 517 if the in-focus control operation is absolutely impossible. If YES in step 517, a message indicating this is displayed using the LCD 24 in the finder or the like in step 518. The same applies to in-focus discrimination in the visual axis selection AF mode in step 508, and if NO in step 508, the flow advances to step 517 to discriminate an impossible state. Step 517 is followed by a display routine for informing a message indicating that the in-focus state of an object whose distance is currently measured cannot be attained to a photographer.

If it is determined in step 517 that the number of times of distance measurement is small, and the in-focus impossible state is not detected, or if an in-focus impossible display is made in step 518, the flow advances to step 519 to check if the visual axis selection AF or the auto selection AF is being executed. If the visual axis selection AF is being performed, the flow advances to step 507; if the auto selection AF is being performed, the flow advances to step 515 to repeat the corresponding operation.

If it is determined in step 513 that the release switch SW2 is OFF, the flow advances to step 521 in FIG. 14 to start a depth of field confirmation routine based on the visual axis input function.

In step 521, the number of times of visual axis detection to be started is discriminated. If the number of times of visual axis detection is 30 or less, the flow advances to step 522 to check if known AI servo AF for repeating distance measurement while tracing an object is to be performed. If NO in step 522, the flow advances to step 523 to check in turn if the visual axis input function selection switch 46 is at position "0", i.e., the visual axis input function is invalid. If YES in step 523, the flow returns to step 512 in FIG. 13B. However, in this case, since the switch 46 is set at position "1", the flow advances to step 524 to perform the visual axis detection of the visual axis input index 205 in the field of view of the finder.

In step 525, it is checked if the visual axis input index 205 has been continuously detected twice. If NO in step 525, the flow returns to step 512 in FIG. 13B, and detection is repeated up to 30 times on the basis of the discrimination result in step 521.

However, if YES in step 525, the flow advances to step 526 to perform a superimpose display of the visual axis input index 205 using the LED 18 so as to inform a message indicating this to the photographer. This display is also made based on the brightness corresponding to the photomerry value of the peripheral area 213 obtained by the photomerry circuit 102 in step 509.

Upon completion of the display, a control signal is generated on the basis of the pre-set shutter speed or aperture value, or the aperture value based on the locked photometry value obtained in step 509, and is supplied to the stop drive circuit 111 to drive the stop to a predetermined aperture size, thereby forming an object image on the focusing screen 7 by a light beam under the same condition as in the photographing operation (step 527). Therefore, the depth of field can be formed on the finder.

Upon completion of the stop-down operation, the state of the switch SW1 is detected in step 528. If the switch SW1 is ON, the flow advances to step 529 to wait until the release switch SW2 is turned on. When the switch SW2 is turned on, the same release sequence as in step 520 is executed.

If the switch SW1 is turned off before the release switch SW2 is turned on, the flow advances from step 528 to step 531 to reopen the stopped-down stop, and the flow returns to step 501 to detect the state of the switch SW1 again.

If the 31st visual axis detection is detected in step 521 for discriminating the number of times of visual axis detection, the flow advances to step 532 to turn off a display of the visual axis input mark 78 on the LCD 24 in the finder so as to inform the end of visual axis. Thereafter, the flow returns to step 512 in FIGS. 13B to detect the state of the switch SW1.

Figure 15A:
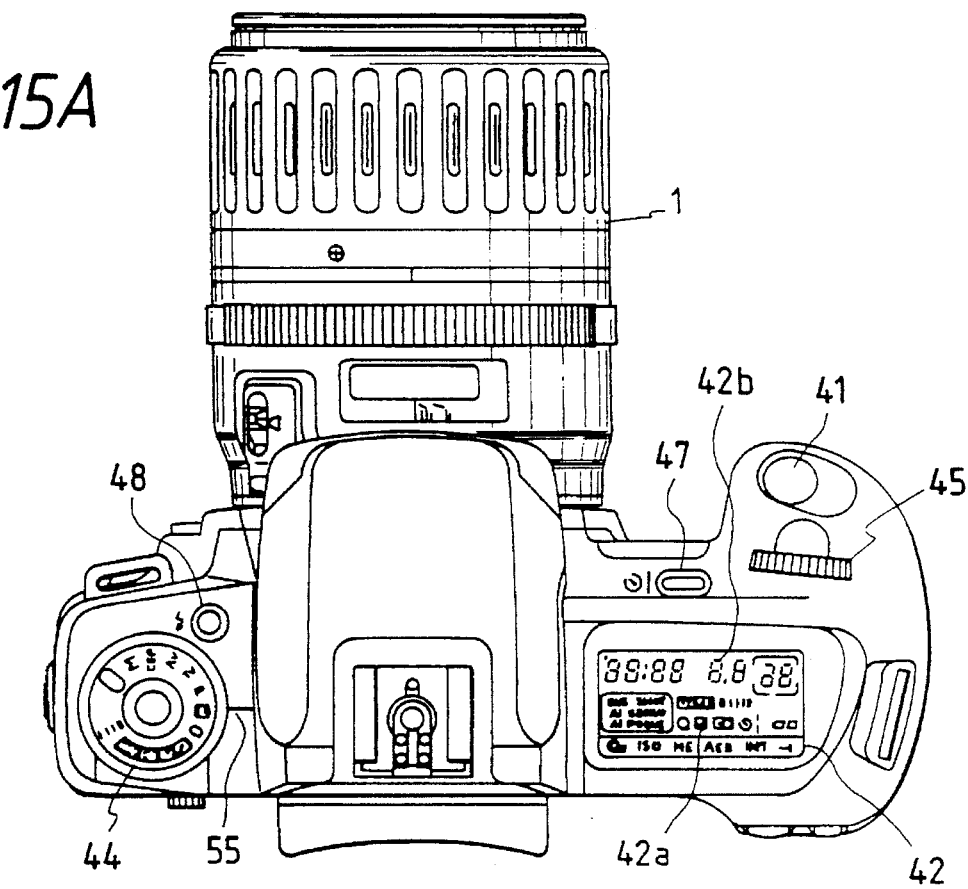
FIGS. 15A and 15B are respectively a top view and a rear view of a camera according to the third embodiment in which the present invention is applied to a single-lens reflex camera.
Figure 15B:
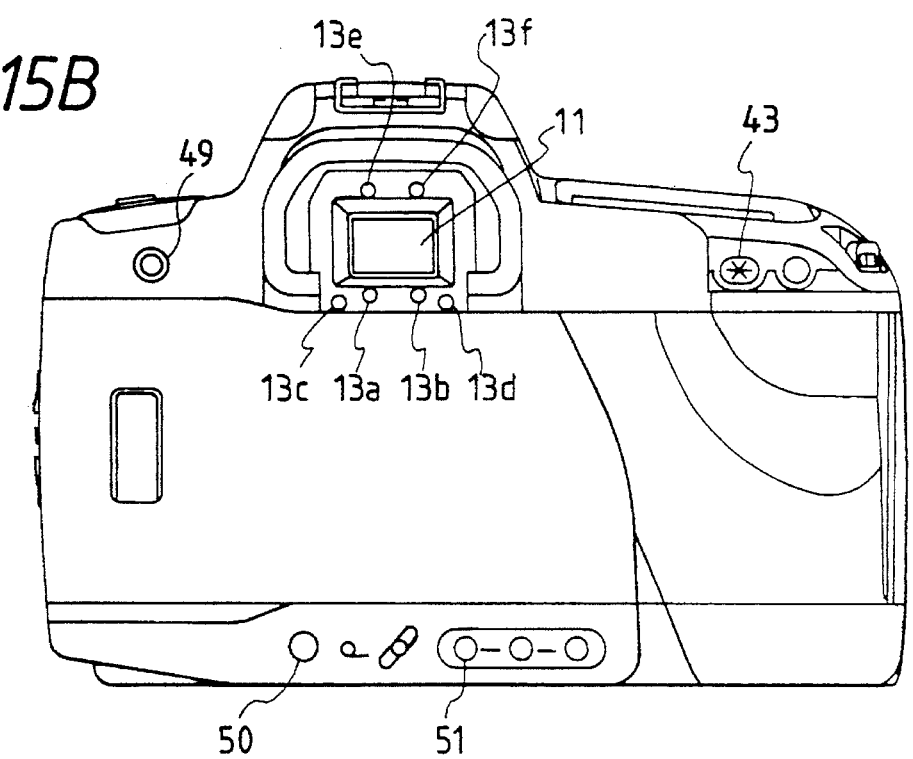

FIGS. 15A and 15B show the third embodiment in which the present invention is applied to a single-lens reflex camera, and are substantially the same as FIGS. 4A and 4B in the first embodiment, except that a visual axis input function set button 49 is arranged in place of the visual axis input function selection button 46.

In the third embodiment, the visual axis input function is set by simultaneously pushing the visual axis input function set button 49 and an operating button to be enabled by the visual axis input. Therefore, a desired function can be enabled not only by pushing the operating button but also using the visual axis input.

Figure 16:
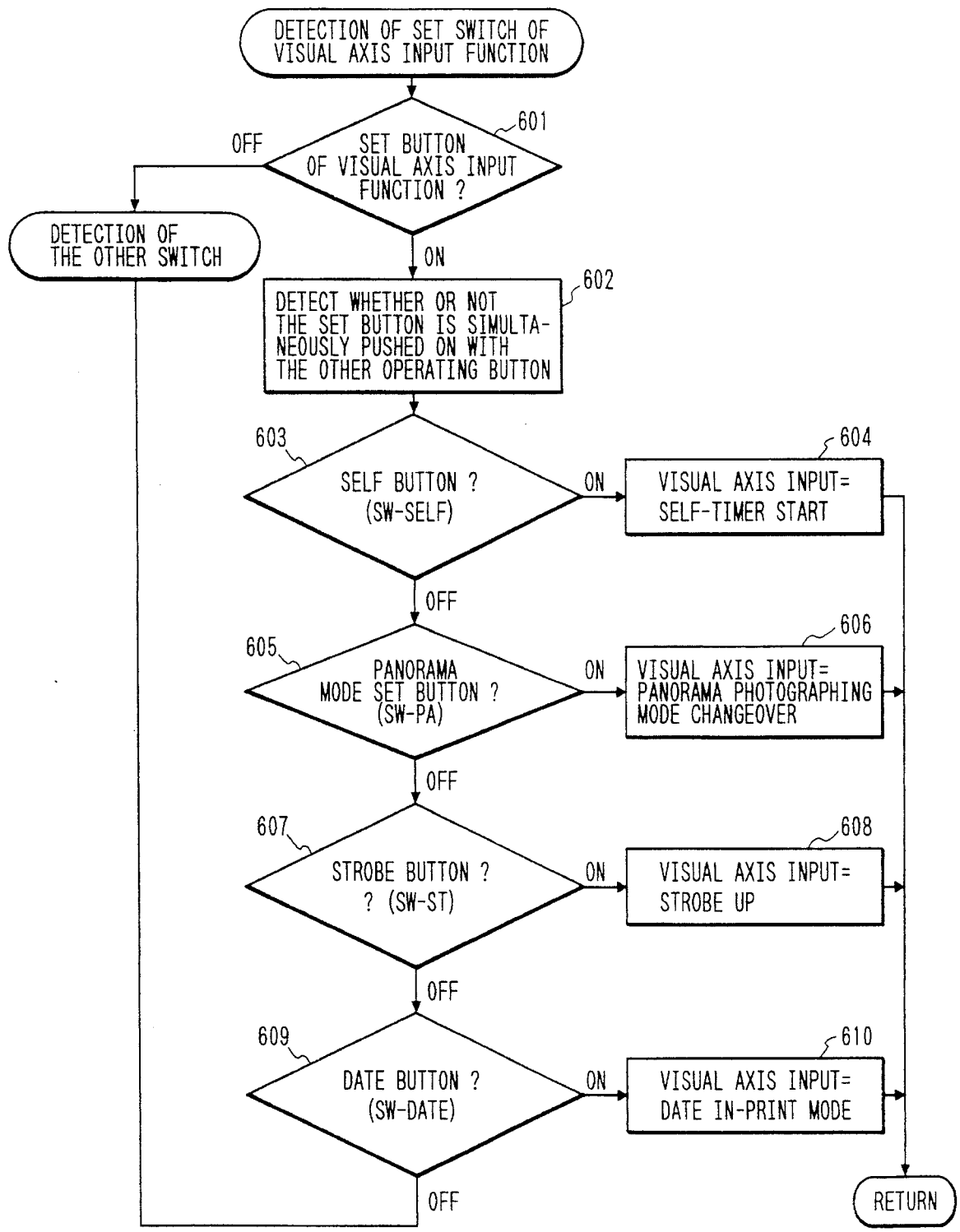
FIG. 16 is a flow chart showing main part of the operation of the camera shown in FIGS. 15A and 15B.

This operation will be described below with reference to the flow chart in FIG. 16.

When the CPU 100 enters a flow for detecting a set switch of a visual axis input function in the flow for detecting a pushed operating button, it detects the state of the visual axis input function set button 49 in step 601. As a result, if the button 49 is ON, the flow advances to step 602 to detect if the button 49 is pushed simultaneously with another operating button.

For example, the state of the self button 47 is detected in step 603. If the button 47 is ON, the flow advances to step 604, and the visual axis input function is set to be "self-timer start". The camera operation after the flow returns is the same as that described above with reference to FIG. 10.

If it is determined in step 603 that the self button 47 is OFF, the flow advances to step 605 to detect the state of a panorama mode set button 50. If the button 50 is ON, the flow advances to step 606, and the visual axis input function is set to be "panorama photographing mode changeover". The camera operation after the flow returns is the same as that described above with reference to FIG. 11.

If it is determined in step 605 that the panorama mode set button 50 is OFF, the flow advances to step 607 to detect the state of the stroboscope button 48. If the button 48 is ON, the flow advances to step 608, and the visual axis input function is set to be "strobe up". This set mode is a function of popping up the built-in stroboscope by the visual axis function, and this camera operation will be described below with reference to the flow chart in FIG. 17.

Figure 17:
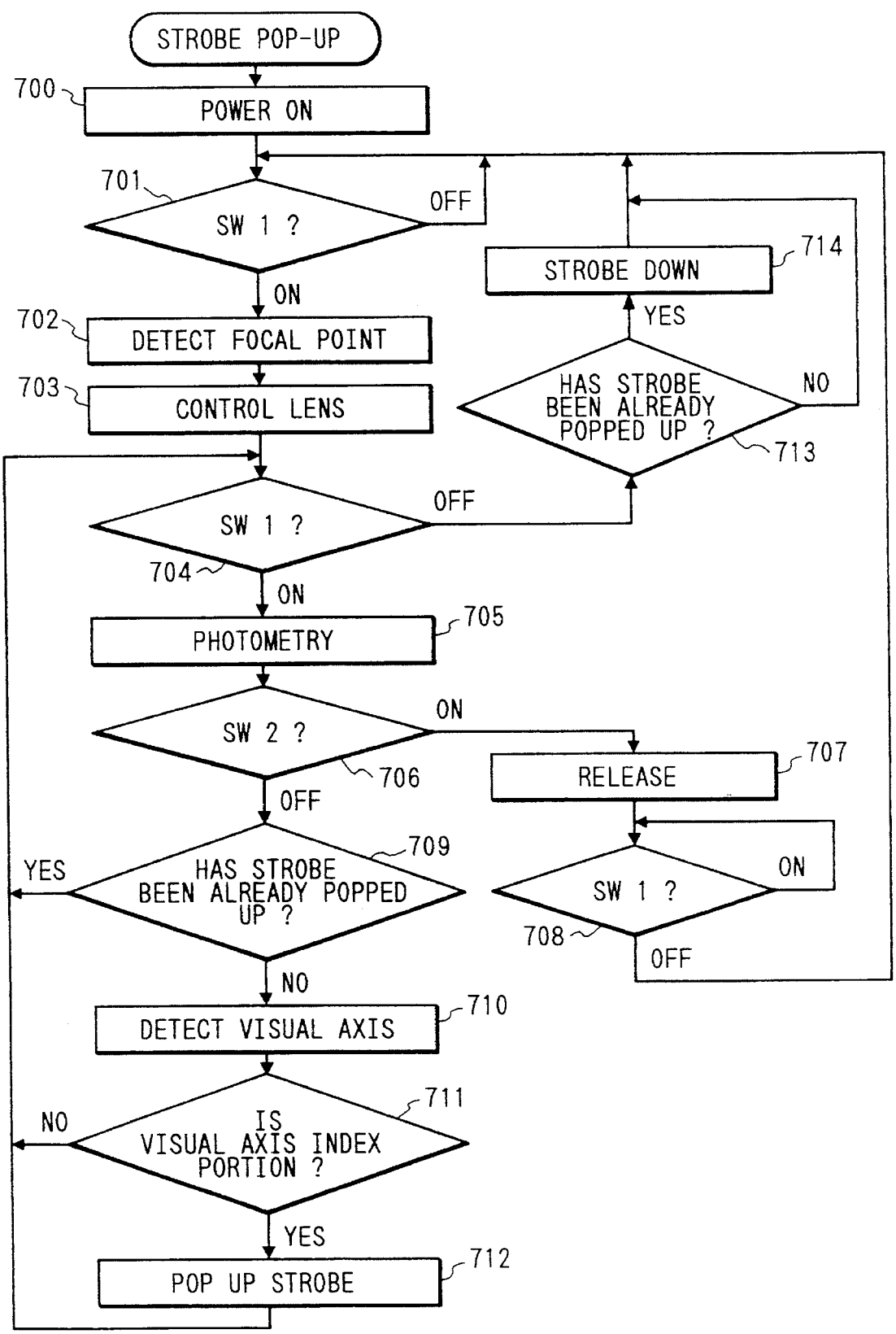
FIG. 17 is a flow chart showing the operation executed when a visual axis input function is set to be "strobe pop-up" in the third embodiment of the present invention.

Since the operation in FIG. 17 is substantially the same as that in FIG. 8, only the difference will be described below.

Step 705 is the step of performing substantially the same operation as in step 105 in FIG. 8, except that the stroboscope up mark 71 indicating that the visual axis input function is set to be "strobe up" is turned on in the LCD 24 in the finder.

Step 709 is the step of performing the same operation as in step 109 in FIG. 8, step 712 is the step of performing the same operation as in step 112 in FIG. 8, step 713 is the step of performing the same operation as in step 113 in FIG. 8, and step 714 is the step of performing the same operation as in step 114 in FIG. 8. Therefore, discrimination of "has stopped-down condition been already set" is replaced by discrimination of "has strobe been already popped up?", and "reopen stop" is replaced by "strobe down".

Figure 18:
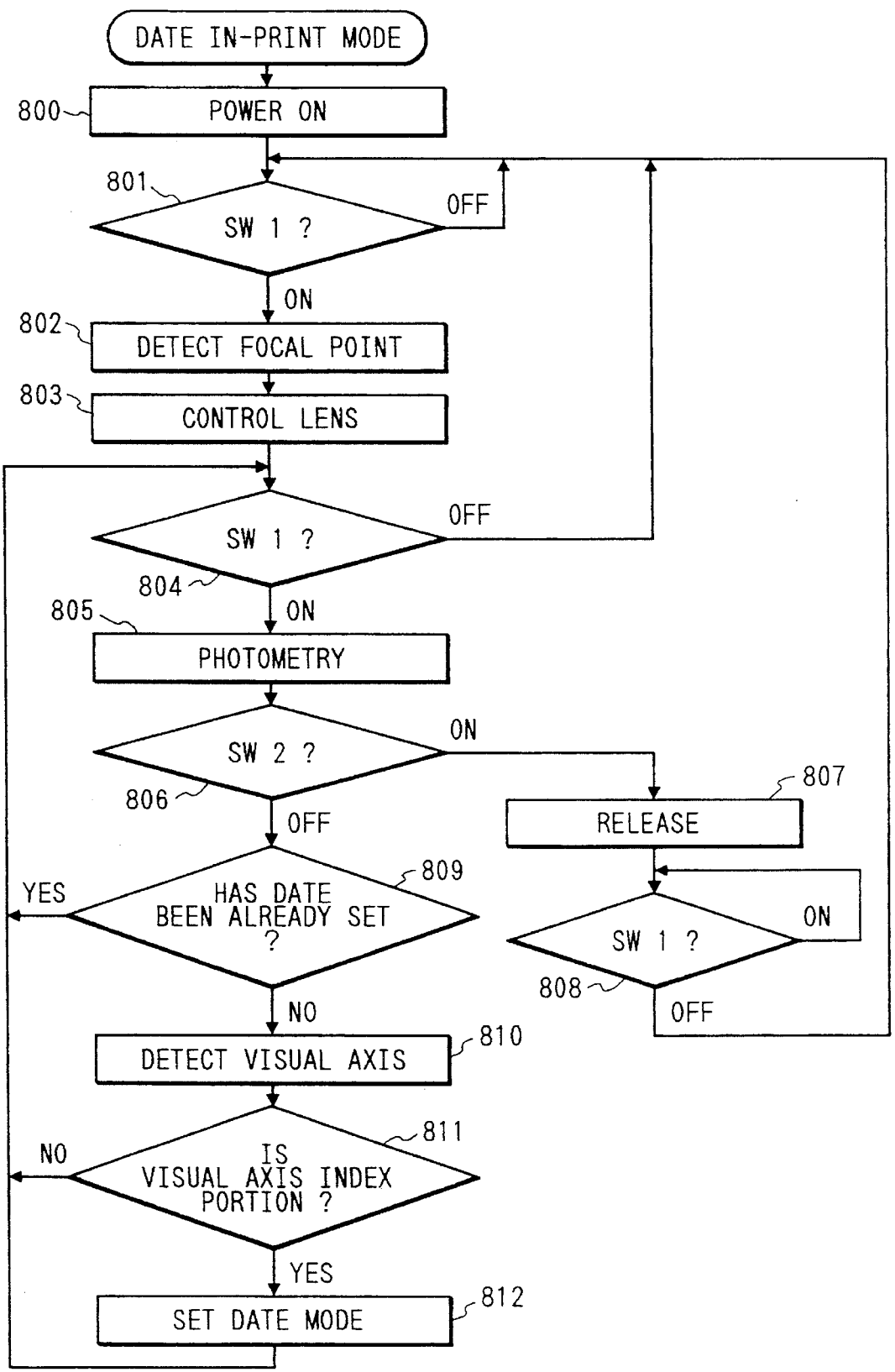
FIG. 18 is a flow chart showing the operation executed when a visual axis input function is set to be "date in-print mode" in the third embodiment of the present invention.

Referring back to FIG. 16, if it is determined in step 607 that the stroboscope button 48 is OFF, the flow advances to step 609 to detect the state of a date set button 51 (see FIGS. 15A and 15B). If the button 51 is ON, the flow advances to step 610, and the visual axis input function is set to be "date in-print mode". This set mode is a function of setting a date in-print mode for in-printing a date upon pushing of the release button by the visual axis input. This operation is shown in the flow chart in FIG. 18. However, since this operation is the same as that in FIG. 17 and is substantially the same as that in FIG. 8, a detailed description thereof will be omitted.

If it is determined in step 609 that the date set button 51 is OFF, and none of operating buttons are pushed simultaneously with the visual axis input function set button 49, the control exits the detection flow of the visual axis input function set switch, and starts the detection flow of another operation switch.

If it is determined in step 601 that the visual axis input function set button 49 is not turned on, the control similarly starts the detection flow of another operation switch.

The characteristic feature of the third embodiment is as follows. That is, although functions to be set as visual axis input functions are limited to those executed by operating buttons already arranged on the camera, no large slide switch is required, and only a small push-button switch is required, thus providing advantages in terms of space and cost. The number of functions to be selected is not limited to four described in this embodiment, but can be basically set in correspondence with the number of operating buttons.

When a new visual axis input function is set in this embodiment, if another function has already been set, the new function replaces the old one, as a matter of course.

The fourth embodiment associated with setting of the visual axis input function according to the present invention will be described below.

In the fourth embodiment, the visual axis input function is set in a so-called custom function mode in which a photographer can selectively use functions which are pre-set in the camera.

Figure 19:
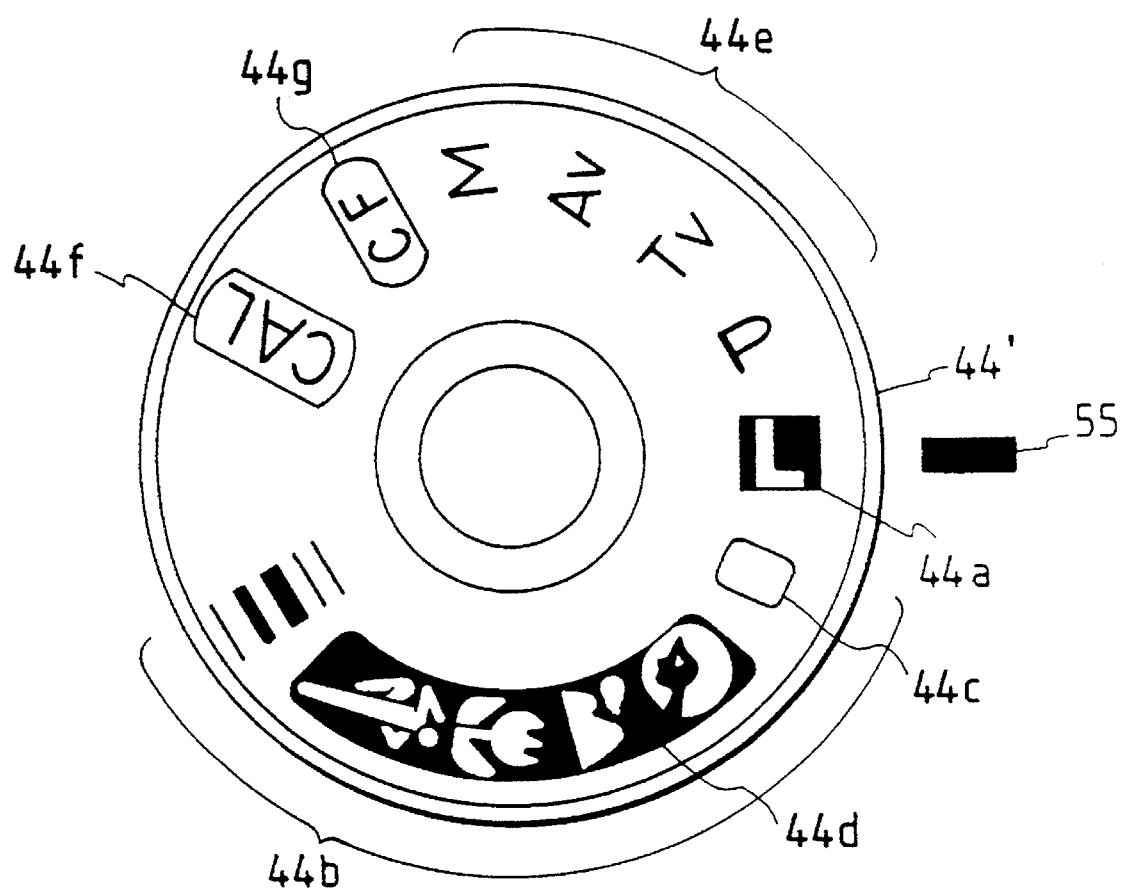
FIG. 19 is a plan view showing a mode dial in the fourth embodiment in which the present invention is applied to a single-lens reflex camera.

FIG. 19 shows an embodiment of a mode dial 44' provided with a custom function mode position.

When the mode dial 44' is rotated to be unlocked from the lock position and a mark 44g indicating the custom function mode is adjusted to the index 55, "CF 1-0" is displayed using the 7-segment portion 62 for displaying the shutter speed and the 7-segment portion 63 for displaying the aperture value, as shown in in FIG. 20A. When "0" is displayed on the 7-segment portion 63, functions pre-set in the display "CF number" on the 7-segment portion 62 are not enabled; when a numeral other than "0" is displayed, one of the pre-set functions is enabled.

When the electronic dial 45 (see FIGS. 4A and 4B) is rotated, "CF number" and its setting condition are displayed in the order of FIG. 20A→FIG. 20B→FIG. 20C→FIG. 20D→FIG. 20E→FIG. 20F→FIG. 20A.

In this case, each of six different functions "CF1" to "CF6" is "enabled" or "disabled" (indicated by 0 or 1), or one of a plurality of selection items can be selected for each of these functions.

For example, in "CF1", the above-mentioned visual axis input function can be selected from a plurality of functions, and in "CF2", whether or not a leader portion is "wound" or "not wound" into the patrone upon rewinding of a film can be selected.

In FIG. 20A, since "0" is displayed on the 7-segment portion 63, "visual axis input function is invalid" is set. In this state, when the AE lock button 43 (SW-AEL) is pushed, a display on the 7-segment portion 63 is switched to "1", as shown in FIG. 21B. In this case, the visual axis input function is set to be "confirm depth of field". Similarly, in FIG. 21C, "start self-timer" is set as a function to be enabled by the visual axis input; in FIG. 21D, "changeover panorama photographing mode" is set; in FIG. 21E, "strobe pop-up" is set; and in FIG. 21F, "date in-print mode" is set.

When the mode dial 44' is rotated from the position of the custom function mode in one of FIGS. 21A to 21F, a function having the contents in one of FIGS. 21A to 21F is enabled by the visual axis input.

The operations to be executed when the corresponding functions are set are as shown in the flow charts of FIGS. 8, 10, 11, 12, 18, and 19.

As described above, in the fourth embodiment, the visual axis input function can be selected from five different functions. The characteristic feature of this embodiment is as follows. That is, by only providing the custom function mode position to the mode dial 44', one of a plurality of functions can be selected as the visual axis input function without arranging any new external operating switch such as a visual axis input function selection switch or a visual axis input function set button.

For this reason, this embodiment is advantageous in design and cost of the camera. Also, the number of functions to be selected is not limited to the number of already arranged operating buttons unlike in the third embodiment, and can be increased as long as the capacity of the CPU allows.

It is not always preferable to have a large number of visual axis input functions, and only a few of these functions are frequently used depending on a photographing condition.

Therefore, the fifth embodiment of the present invention relates to an auto set mode in which a photographer cannot arbitrarily set a visual axis input function but a camera automatically sets a visual axis input function in correspondence with a photographing mode.

Table 1 below shows the correspondence between photographing modes and visual axis input functions to be set in correspondence with these photographing modes in the fifth embodiment in which the present invention is applied to a single-lens reflex camera, i.e., shows an example of the auto set mode. When the mode dial 44 is set at the position for the manual photographing mode, the visual axis input function is set to be "confirm depth of field" shown in FIG. 8.

TABLE 1

| Photographing Mode | | Function to be Set (Corresponding FIG.) |
|---|---|---|
| Program AE | | |
| Shutter Priority AE | Manual | Confirm Depth |
| Stop Priority AE | Photo- | of Field |
| Object Depth Priority AE | graphing | (Operation in FIG. 8) |
| Manual Exposure | | |
| Full Auto Mode | | Visual Axis Input Function is Invalid (Operation in FIG. 12) |
| Portrait Mode | | Strobe Pop-up (Operation in FIG. 17) |
| Landscape Mode | | Changeover Panorama Photographing Mode (Operation in FIG. 11) |
| Close-up Mode | | Start Self-timer (Operation in FIG. 10) |
| Sport Mode | | Visual Axis Input Function is Invalid (Operation in FIG. 12) |

Figure 12:
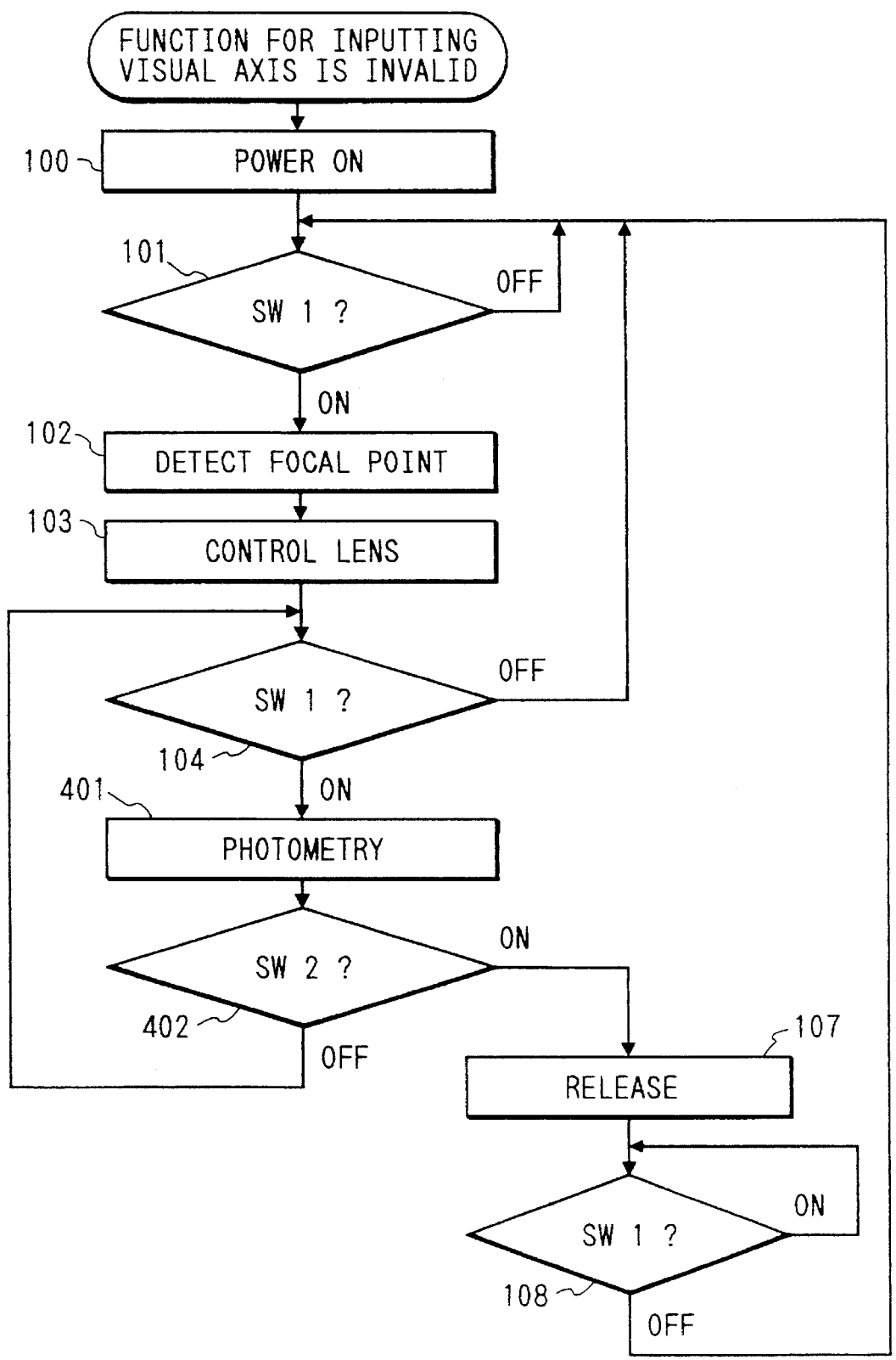
FIG. 12 is a flow chart showing the operation executed when the visual axis input function is set to be "function for inputting visual axis is invalid" in the first embodiment.

Similarly, since the full auto mode is a position at which the arbitrarily set contents are reset and all the functions are controlled by the camera, the visual axis input function is pre-set to be "visual axis input function is invalid" shown in FIG. 12. In the portrait mode, although it is a general practice to automatically pop up the stroboscope depending on the luminance of external light, the visual axis input function is pre-set to be "strobe pop-up" shown in FIG. 17 so as to emit strobe light even in a bright location when catch light is to be irradiated onto the pupil of a person. In the landscape mode, since a picture of a wide scenery is normally taken, the visual axis input function is pre-set to be "changeover panorama photographing mode" shown in FIG. 11. In the close-up mode, since a close-up photographing operation is normally performed while the camera is attached to a tripod so as to prevent a camera shake, the visual axis input function is pre-set to be "start self-timer" (note that the self-timer time is preferably set to be 2 second in place of 10 second which is normally set). In the sport mode, since a picture of a moving object is normally taken, and hence, the visual axis movement is large, the visual axis input function is pre-set to be "visual axis input function is invalid" shown in FIG. 12 as in the full auto mode, so as to prevent an unexpected input.

In this method, a photographer cannot desirably set the visual axis input function. However, since the visual axis input function is automatically reset, the photographer need not set the functions one by one, and the most effective functions are pre-set, resulting in good operability.

This embodiment may be combined with the fourth embodiment described above, so that whether "visual axis input function is automatically set" or "visual axis input function is not automatically set" is selected in the custom function mode, or "CF1-7" may be provided to the fourth embodiment, and when "7" is set, the visual axis input function may be set in the "auto set" mode.

In each of the above embodiments, the visual axis input index 205 for performing a confirmation display when the visual axis input is made is realized by a self-emission display method for illuminating the index 205 with light emitted from the light-emitting diode. However, the index 205 may be realized by a transmission type non-emission display method such as a guest-host LCD.

In each of the above embodiments, the contents of the visual axis input function are changed in correspondence with the "photographing mode". However, it is also effective to change the contents of the visual axis input function in correspondence with conventional operation modes of the camera, for example, AF modes (one-shot AF, servo AF), film feed modes (single photographing, continuous photographing), and photomerry modes (average, partial, evaluation photomerry).

In each of the above embodiments, the present invention is applied to a single-lens reflex camera. However, the present invention may be applied to video equipment such as a video camera, a still video camera, and the like, and may also be applied to optical measurement equipment with a finder device.

According to each of the above embodiments, an apparatus which comprises visual axis detection means for detecting the visual axis position of a photographer who looks into the field of view of a finder, comprises means for executing a predetermined function when it is detected that the visual axis of the photographer is present on or near a visual axis input index arranged in the field of view of the finder, so that the photographer can arbitrarily select a function to be executed. Therefore, the number of visual axis input indices in the finder can be small, and the finder display can be prevented from being complicated and is easy to see. In addition, display devices which are required in correspondence with the number of indices can be omitted, thus reducing cost. Furthermore, since various functions can be selected, photographers' requirements can be satisfied.

A function to be executed is automatically set by the visual axis input in correspondence with the operation mode of the apparatus, resulting in good operability.

In the panorama photographing mode, since the visual axis input index arranged in the field of view of the finder and outside a panorama index can be displayed in a display mode different from a normal state, the panorama photographing mode can be easily informed to a photographer without disturbing framing in the panorama photographing mode.

Since the visual axis selection AF for selecting one of a plurality of distance measurement points in correspondence with the visual axis position, and performing an auto focusing point detection operation at the selected distance measurement point, and the visual axis input function for executing a predetermined function when the visual axis position of the photographer is located on or near the visual axis input index arranged in the field of view of the finder can be independently executed, these functions can be selectively used in correspondence with the photographer's will. In addition, the visual axis input function can be arbitrarily disabled if it is not required, thus preventing an input error in a close-up photographing mode or a copy photographing mode in which a photographer must look at all the corners of the finder.

What is claimed is:

1. An optical apparatus with a visual axis detection function, which comprises finder means for observing an object, and visual axis detection means for detecting a visual axis direction of an observer who looks into the finder means, said apparatus comprising:

a visual axis input index which is arranged in the finder means;

visual axis input means for executing a selected function when said visual axis detection means detects that the visual axis of the observer is located on or near said visual axis input index; and selection means for causing the observer to select the function to be executed by said visual axis input means from a plurality of functions without using said visual axis detection means.

2. An apparatus according to claim 1, wherein said selection means comprises means for reading out one of functions stored in storage means in correspondence with selected contents, and selecting the readout function as the function.

3. An apparatus according to claim 1, further comprising display means, arranged in said finder means, for displaying control contents of said apparatus, and display control means for causing said display means to display the function selected by said selection means.

4. An apparatus according to claim 1, further comprising a plurality of operation means for executing a plurality of functions, and wherein said selection means is means which comprises set operation means for setting a function to be executed by said visual axis input means, and causes said visual axis input means to execute the function of one of said operation means so as to select the function when one of said operation means and said set operation means are simultaneously operated.

5. An optical apparatus with a visual axis detection function, which comprises finder means for observing an object, visual axis detection means for detecting a visual axis direction of an observer who looks into the finder means, and a plurality of operation means for executing different functions of said apparatus, said apparatus comprising:

a visual axis input index which is arranged in the finder means;

visual axis input means for executing a selected function when said visual axis detection means detects that the visual axis of the observer is located on or near said visual axis input index;

setting means for setting a function to be executed by said visual axis input means; and function instruction means for, when said setting means and one of said operation means are simultaneously operated, instructing a function corresponding to the operated operation means to said visual axis input means as the selected function.

6. An optical apparatus with a visual axis detection function, which comprises finder means for observing an object, visual axis detection means for detecting a visual axis direction of an observer who looks into the finder means, and mode setting means for setting one of different operation modes of said apparatus, said apparatus comprising:

a visual axis input index which is arranged in the finder means;

visual axis input means for executing a selected function when said visual axis detection means detects that the visual axis of the observer is located on or near said visual axis input index; and changing means for changing the function to be executed by said visual axis input means in correspondence with the operation mode set by said mode setting means.

7. An apparatus according to claim 6, wherein said mode setting means comprises means for setting operation modes of a camera.

8. An optical apparatus with a visual axis detection function, which comprises finder means for observing an object, visual axis detection means for detecting a visual axis direction of an observer who looks into the finder means, and panorama mode setting means for setting a mode for allowing a panorama photographing operation, said apparatus comprising:

a panorama index which is arranged in said finder means and indicates a panorama photographing range;

a visual axis input index which is arranged outside said panorama index, in said finder means; and index display control means for, when said panorama mode setting means sets the panorama mode, changing a display mode of said visual axis input index to be different from a normal photographing mode.

9. An apparatus according to claim 8, wherein said index display control means comprises means for turning on or flickering said visual axis input index when the panorama mode is set.

10. An apparatus according to claim 8, wherein said index display control means comprises means for displaying said visual axis input index in a color different from a normal mode when the panorama mode is set.

11. An optical apparatus with a visual axis detection function, which comprises finder means for observing an object, visual axis detection means for detecting a visual axis direction of an observer who looks into the finder means, and focusing means for performing focusing operation to a plurality of areas in the field of view of the finder, said apparatus comprising:

visual axis selection means for selecting one of the plurality of areas as a focusing operation area in accordance with the visual axis direction of the observer; and visual axis input means for executing a function selected when said visual axis detection means detects that the visual axis of the observer is located on or near said visual axis input index, wherein whether or not said visual axis selection means and said visual axis input means are enabled can be arbitrarily selected respectively.

12. An optical apparatus with a plurality of functions, comprising:

an index provided in a field of view;

input means for causing said optical apparatus to execute at least one function by detecting that a visual axis is directed to a position near said index; and selection means for selecting the function which is executed by said optical apparatus under the control of said control of said input means from the plurality of functions without using the visual axis.

13. An apparatus according to claim 12, wherein said optical apparatus has a plurality of operation modes, and said selection means comprises means for storing the plurality of functions in correspondence with the plurality of operation modes, and means for selecting at least one mode from the plurality of operation modes, and determining the function to be executed by said optical apparatus upon selection.

14. An apparatus according to claim 12, wherein said optical apparatus comprises a camera.

15. An apparatus according to claim 13, wherein said optical apparatus comprises a camera.

16. An apparatus according to claim 14, wherein the plurality of functions include a depth of field confirmation function, a panorama photographing function, a self-timer photographing function, and a strobe pop-up function.

17. An apparatus according to claim 15, wherein the plurality of functions include a depth of field confirmation function, a panorama photographing function, a self-timer photographing function, and a strobe pop-up function.

18. An apparatus according to claim 12, wherein said index is turned on in response to the visual axis detection.

19. An apparatus according to claim 12, wherein said index flickers in response to the visual axis detection.

20. An apparatus according to claim 12, wherein a color of said index is changed in response to the visual axis detection.

* * * * *

UNITED STATES PATENT AND TRADEMARK OFFICE
CERTIFICATE OF CORRECTION

PATENT NO. : 5,600,399                Page 1 of 3
DATED      : February 4, 1997
INVENTOR(S): AKIRA YAMADA, ET AL.

It is certified that error appears in the above-indentified patent and that said Letters Patent is hereby corrected as shown below:

COLUMN 1

Line 9, "Filed" should read --Field--.

COLUMN 4

Line 56, "superimpose" should read --superimposition--.

COLUMN 5

Line 2, "superimpose" should read --superimposition--.

COLUMN 7

Line 27, "Of" should read --of--.
Line 29, "photomerry" should read --photometry--.
Line 42, "CCDL-1," should read --CCD-L1,--.

COLUMN 8

Line 12, "superimpose," should read --superimposition,--.

COLUMN 9

Line 15, "photomerry" (both occurrences) should read --photometry--.
Line 16, "photomerry" should read --photometry--.

UNITED STATES PATENT AND TRADEMARK OFFICE
CERTIFICATE OF CORRECTION

PATENT NO. : 5,600,399    Page 2 of 3
DATED : February 4, 1997
INVENTOR(S) : AKIRA YAMADA, ET AL.

It is certified that error appears in the above-indentified patent and that said Letters Patent is hereby corrected as shown below:

COLUMN 10

Line 43, "photomerry" should read --photometry--.

COLUMN 11

Line 7, "second)" should read --seconds)--.
Line 51, "photomerry" should read --photometry--.

COLUMN 12

Line 45, "photomerry" should read --photometry--.
Line 58, "gazing" should read --gazing along--.

COLUMN 13

Line 23, "superimpose" should read --superimposition--.
Line 39, "photomerry" should read --photometry--.
Line 42, "superimpose" should read --superimposition--.
Line 47, "photomerry" should read --photometry--.
Line 51, "photomerry" should read --photometry--.

UNITED STATES PATENT AND TRADEMARK OFFICE
CERTIFICATE OF CORRECTION

PATENT NO. : 5,600,399
DATED : February 4, 1997
INVENTOR(S) : AKIRA YAMADA, ET AL.

It is certified that error appears in the above-indentified patent and that said Letters Patent is hereby corrected as shown below:

COLUMN 15

Line 3, "photomerry" should read --photometry--.
Line 4, "photomerry" should read --photometry--.
Line 29, "FIGS." should read --FIG.--.

COLUMN 18

Line 2, "44" should read --44'--.
Line 46, "second" should read --seconds--.
Line 47, "10 second" should read --the 10 seconds--.

COLUMN 19

Line 13, "photomerry" should read --photometry--.
Line 14, "photomerry)." should read --photometry).--.

Signed and Sealed this

Eighth Day of July, 1997

*Attest:*

BRUCE LEHMAN

*Attesting Officer*   Commissioner of Patents and Trademarks